(12) United States Patent
Gonzalez

(10) Patent No.: US 7,347,294 B2
(45) Date of Patent: Mar. 25, 2008

(54) POWER SYSTEM FOR ELECTRICALLY POWERED LAND VEHICLE

(76) Inventor: Encarnacion H. Gonzalez, P.O. Box 1321, Alice, TX (US) 78332

(*) Notice: Subject to any disclaimer, the term of this patent is extended or adjusted under 35 U.S.C. 154(b) by 1018 days.

(21) Appl. No.: 10/765,110

(22) Filed: Jan. 28, 2004

(65) Prior Publication Data

US 2004/0231315 A1    Nov. 25, 2004

Related U.S. Application Data

(60) Provisional application No. 60/472,085, filed on May 21, 2003.

(51) Int. Cl.
    *B60K 1/00*    (2006.01)
    *B60K 16/00*   (2006.01)
(52) U.S. Cl. .................. 180/65.1; 180/2.2; 180/165
(58) Field of Classification Search ............. 180/65.1, 180/2.2, 65.3; 60/202
    See application file for complete search history.

(56) References Cited

U.S. PATENT DOCUMENTS

| | | | |
|---|---|---|---|
| 3,119,233 A | 1/1964 | Wattendorf et al. | 60/202 |
| 3,303,650 A | 2/1967 | Yonts | 60/202 |
| 3,878,913 A * | 4/1975 | Lionts et al. | 180/2.2 |
| 4,089,384 A | 5/1978 | Ehrenberg | 180/236 |
| 4,109,743 A | 8/1978 | Brusaglino et al. | 180/65.4 |
| 4,341,847 A * | 7/1982 | Sammells | 429/27 |
| 4,485,310 A | 11/1984 | de Valroger | 290/52 |
| 4,554,989 A | 11/1985 | Gruich | 180/65.4 |
| 4,578,609 A | 4/1986 | Medina | 60/709 |
| 5,005,361 A | 4/1991 | Phillips | 60/671 |
| 5,185,541 A | 2/1993 | Jensen | 310/11 |
| 5,280,827 A | 1/1994 | Taylor et al. | 180/165 |
| 5,352,954 A | 10/1994 | Cirri | 315/111.21 |
| 5,432,383 A | 7/1995 | Kawamura | 290/14 |
| 5,584,355 A | 12/1996 | Burns | 180/165 |
| 5,746,283 A | 5/1998 | Brighton | 180/65.3 |
| 5,760,515 A | 6/1998 | Burns | 310/115 |
| 5,849,427 A * | 12/1998 | Siu et al. | 429/19 |
| 5,947,421 A | 9/1999 | Beattie et al. | 244/172 |
| 6,044,922 A | 4/2000 | Field | 180/65.2 |
| 6,121,569 A | 9/2000 | Miley et al. | 219/121.48 |
| 6,138,781 A * | 10/2000 | Hakala | 180/2.2 |
| 6,247,671 B1 | 6/2001 | Saeks et al. | 244/205 |
| 6,357,700 B1 | 3/2002 | Provitola | 244/172 |
| 6,486,483 B2 | 11/2002 | Gonzalez | 250/526 |
| 7,174,703 B2 * | 2/2007 | Hartley | 60/202 |

(Continued)

FOREIGN PATENT DOCUMENTS

GB    2 225 059 A    5/1990

*Primary Examiner*—Jack Berman
*Assistant Examiner*—Johnnie L Smith, II
(74) *Attorney, Agent, or Firm*—Richard C. Litman

(57) ABSTRACT

The power system for an electrically powered land vehicle extracts electrons from ambient air to generate adequate electrical power to operate the land vehicle electrical energy production and propulsion system. The extracted electrons generate enough electrical power to run an electrical propulsion system and all accessory electrical systems of the land vehicle. The power system includes an abutting series of tubular sections defining an airflow path with a heating plates in the airflow path and variable positive voltage grids to extract charged particles from the heated air. Air is drawn into the airflow path by a centrifugal impeller. The ionized air not used to generate electric power is neutralized in an ionized gas neutralizing chamber and then exhausted.

18 Claims, 19 Drawing Sheets

U.S. PATENT DOCUMENTS

2002/0131869 A1*  9/2002  Makino et al. ................ 417/53
2003/0057708 A1*  3/2003  Wu ............................. 290/55
2005/0034464 A1*  2/2005  Gonzalez ..................... 60/801
2006/0192097 A1*  8/2006  Anttalainen .................. 250/281
2006/0213697 A1*  9/2006  Sutherland ................... 180/2.2
2007/0089918 A1*  4/2007  Gonzalez ..................... 180/65.1

* cited by examiner

POWER SYSTEM FOR ELECTRICALLY POWERED LAND VEHICLE

CROSS-REFERENCE TO RELATED APPLICATIONS

This application claims the benefit of U.S. Provisional Patent Application Ser. No. 60/472,085, filed May 21, 2003, which is incorporated herein by reference.

BACKGROUND OF THE INVENTION

1. Field of the Invention

The present invention relates to electrically powered land vehicles, and particularly to a power system which produces electrical energy by extracting electrons from the ambient air to provide power to fully power and propel a wheeled, electrically powered land vehicle.

2. Description of the Related Art

A variety of electrical energy production systems have been proposed to operate and propel vehicles. However, electrostatic forces have never been utilized in conventional electrical energy production systems as an energy source to operate and/or propel a vehicle. For instance, U.S. Pat. No. 4,109,743, issued to Giampiero Brusaglino et al. on Aug. 29, 1978, describes a propulsion system for a vehicle having a turbine unit with two electric generators that drive two electric motors connected to the wheels of the vehicle. Similarly, U.S. Pat. No. 6,044,922, issued to Bruce F. Field in Apr. 4, 2000, shows an electric hybrid vehicle that combines a battery pack, electrically powered engine, and an internal combustion engine to provide a more efficient use of the battery pack while operating the vehicle. U.S. Pat. No. 5,947,421, issued to John R. Beattie et al. on Sep. 7, 1999, discloses an electrostatic propulsion system for a spacecraft using the interaction of electrostatic fields on charged propellant particles, such as ions.

U.S. Pat. No. 6,357,700 B1, issued to Anthony I. Provitola on Mar. 19, 2002, discloses an electrical vehicle propulsion system whereby electrical energy is generated by a turbine alternator during vehicle motion to charge the batteries, thereby improving the performance of the vehicles.

U.S. Pat. No. 3,119,233, issued to Frank L. Wattendorf et al. on Jan. 28, 1964, shows a multiple electrode arrangement for producing a diffused electrical discharge. The device includes a high velocity expansion nozzle, an assembly for providing high-pressure gas, a central electrode, a plurality of sharply pointed electrodes, a source of cooling gas, and a source for applying a high alternating voltage. Electrical energy may be generated either as a direct or alternating current output.

U.S. Pat. No. 6,121,569, issued to George H. Miley et al. on Sep. 19, 2000, shows an electrostatic propulsion system using an inertial electrostatic confinement design having discharge plasma for generating ions that provide thrust when accelerated and expelled from propulsion system.

U.S. Pat. No. 3,303,650, issued to Oliver C. Yonts on Feb. 14, 1967, describes an ion propulsion system for space vehicles wherein A.C. power is utilized for ion acceleration, thereby reducing the size and weight of required power supply components. The Yonts patent discloses a space charged neutralized beam for the ionic propulsion of a space vehicle having at least one pair of ion sources. Each of the sources includes a plurality of elongated cavities, a charge material disposed within the cavities, an A.C. heater mounted adjacent to the charge material in each cavity for heating and substantially completely ionizing the charge material, a source of A.C. power connected to each of the heaters, and an ion exit slit disposed in one wall of each of the cavities.

U.S. Pat. No. 5,005,361, issued to Phillips in April 1991, discloses a turbine power plant, which produces power from a high temperature plasma and high voltage electricity. A plurality of ion repulsion discharge chambers are situated along the perimeter of the turbine to accelerate the ions, and a condenser and pump are used to return the condensed gases to a plasma generator.

U.S. Pat. No. 6,486,483, issued to the present inventor, E. H. Gonzalez, on Nov. 26, 2002 and hereby incorporated by reference in its entirety in the current patent application, has offered some of the most significant advances in the field of electric energy production that generate energy from electrostatic forces.

None of the above inventions and patents, taken either singly or in combination, is seen to describe the instant invention as claimed. Thus a power system for an electrically powered land vehicle solving the aforementioned problems is desired.

SUMMARY OF THE INVENTION

The power system for an electrically powered land vehicle of the present invention extracts electrons from ambient air to generate adequate electrical power to operate a wheeled land vehicle electrical energy production and propulsion system. The extracted electrons generate enough electrical power to run all accessory electrical systems of a wheeled land vehicle. The extracted electrons not used to generate electric power are neutralized in an ion gas-neutralizing chamber and then exhausted.

The electrical energy production system includes a multi-stage electrical energy production section, a centrifugal impeller, an ionized gas neutralizing chamber, rechargeable batteries, an inverter, an amplifier/controller, an electric motor or generator, and an exhaust section to operate an all-electric drive vehicle. The apparatus of the present invention is designed to produce electrical energy through a multi-stage electrical energy production section that uses a centrifugal impeller to draw large volumes of ambient air through a series of tubular sections made up of repeated combinations of heating assemblies and variable positive voltage grids. The tube sections cause the molecules to undergo loss of electrons through mechanically induced atomic and molecular impacts and thermal excitation, the free electrons then being collected by the voltage grids and stored in an external battery, or routed to an amplifier/controller that controls one or more electric motors or electrical generators coupled to one or more ground-engaging wheels.

The centrifugal impeller, driven by an electric motor, is securely attached at the rear of the gas ionization section. Rotation of the centrifugal impeller draws high velocity ambient airflow through the gas ionization section to create electrical power. The electrical power is routed to a combination amplifier/controller and is used to power electric motors on each wheel of a basic land vehicle. The electrical power also is used to charge the batteries of the vehicle. An inverter may be electrically connected to the batteries in order to provide A.C. power or an A.C. output as required. The ionized gas exiting the centrifugal impeller immediately enters the ion gas neutralizing chamber, wherein discharge plugs are used to discharge sufficient electrons back into the air to neutralize any ionic charge. Exhaust gas charge sensors, located on each tail pipe, monitor the electric charge of the exhaust gas to verify electric neutralization before expulsion.

Accordingly, it is a principal aspect of the invention to provide a power system for an electrically powered land vehicle that produces electrical energy by ionizing ambient air in order to power and propel a land vehicle.

It is another aspect of the invention to provide a power system for an electrically powered land vehicle that includes a centrifugal impeller that draws high velocity air through a gas ionization section to create electrical power.

It is a further aspect of the invention to provide a power system for an electrically powered land vehicle that provides an ionic propulsion system capable of being used in a land vehicle.

Still another aspect of the invention is to provide a power system for an electrically powered land vehicle having an ion gas neutralizing chamber for neutralizing ionized gas exiting the gas ionization section of the power system.

It is an aspect of the invention to provide improved elements and arrangements thereof in a power system for an electrically powered land vehicle for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
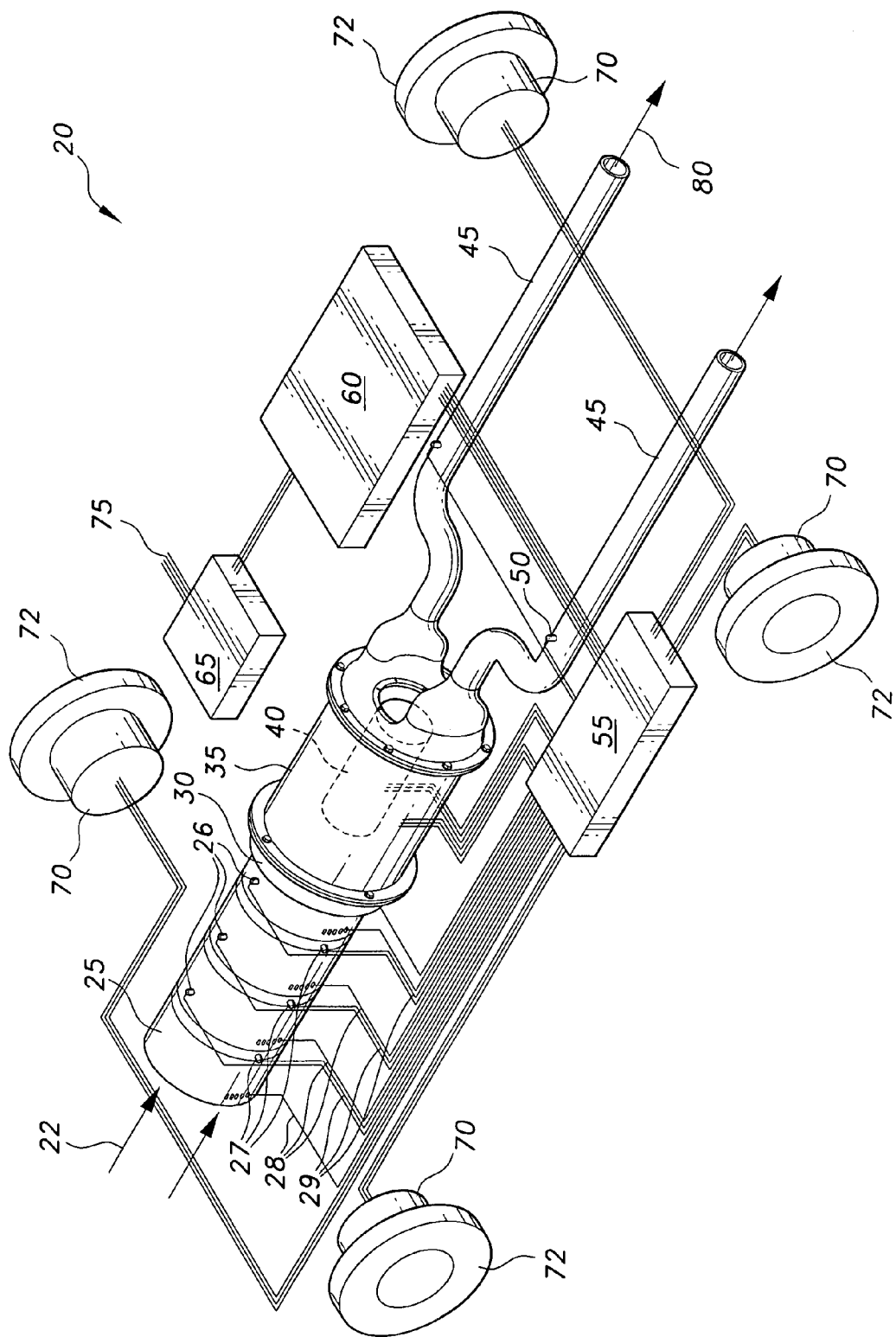
FIG. 1 is a diagrammatic view of a power system for an electrically powered land vehicle according to the present invention.

The present invention is directed to a power system for an electrically powered land vehicle, generally designated as 20 in the drawings. The power system 20 of the present invention provides an alternate energy source for wheeled land vehicles. The power system 20 uses electrons extracted from the ambient air to generate electrical power sufficient to operate a wheeled land vehicle. The power system 20 is designed to produce more than sufficient electric power to run an electric vehicle propulsion system and all accessory electric systems, including air conditioning, stereo/radio, electric heating, AC output from a power inverter, windshield wiping systems, etc.

FIG. 1 shows a diagrammatic view of the basic components required to produce electrical power from ambient air in order to power a wheeled land vehicle. The power system 20 includes a gas ionization and energy production section 25, similar to the electrical energy production system disclosed in the inventor's prior U.S. Pat. No. 6,486,483, hereby incorporated by reference in its entirety.

The basic operation of the present invention uses an electric motor 40 to rotate a centrifugal impeller 30 to draw high velocity ambient air flow through the gas ionization and energy production section 25 to create electrical power using electrons extracted from the ambient air flow 22. The electrical power is routed to amplifier/controller 55 and used to power electric wheel motors 70 on each wheel 72 of a basic wheeled land vehicle. The electrical power also is used to charge the batteries 60 of the vehicle. A power inverter 65 may be electrically connected to batteries 60 in order to provide A.C. power output 75 as required.

The positively charged, ionized air particles, which are not converted into electrical power, exit the centrifugal impeller 30 in the form of ionized gas and immediately enter the ionized gas neutralizing chamber 35. The ionized gas neutralizing chamber 35 uses discharge plugs to discharge sufficient electrons back into the ionized gas to neutralize the electrostatic charge. Exhaust gas ion gas sensors 50, located on each tail pipe 45, monitor the electric charge of exhaust gas 80 to verify electric neutralization before expulsion. The power system 20 of the present invention is preferably an electrically closed system. All electrons being extracted from the ambient airflow 22 will be reintroduced back into the air after utilization.

Figure 2:
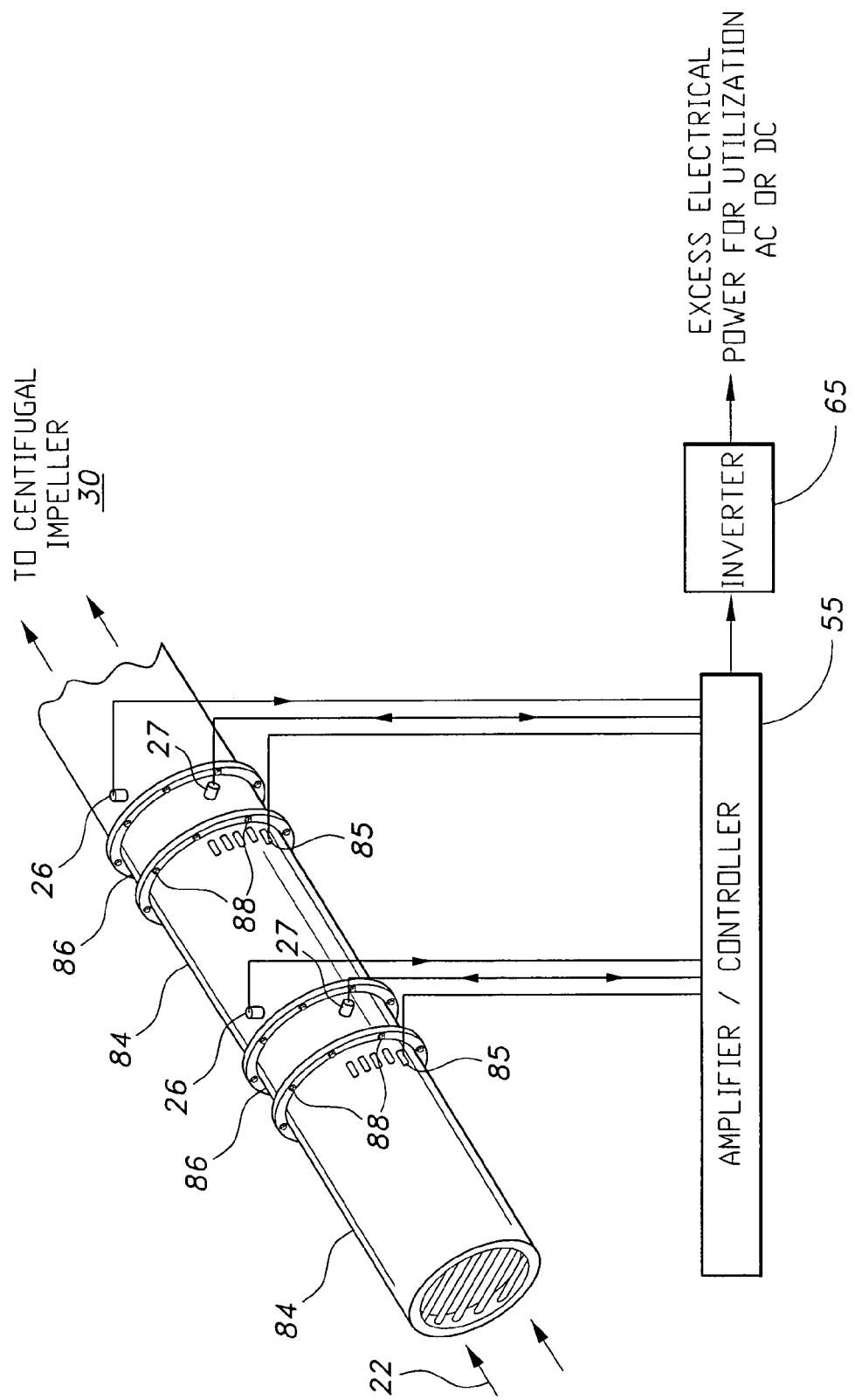
FIG. 2 is a diagrammatic perspective view of the gas ionization and electric energy production section of the power system for an electrically powered land vehicle according to the present invention.
Figure 3:
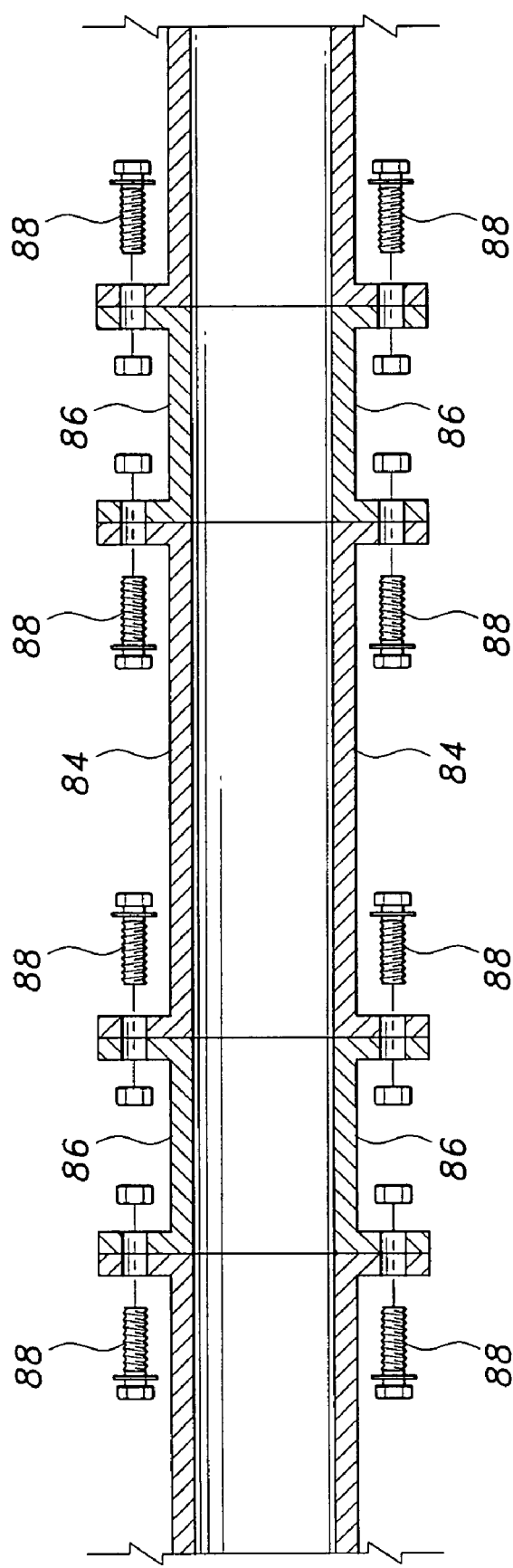
FIG. 3 is a cross sectional view of the gas ionization and electric energy production section shown in FIG. 2.

FIGS. 2 and 3 show a detailed view and a cross sectional view, respectively, of the gas ionization and electric energy production section 25 of the power system 20. The gas ionization and electric energy production section 25 has multiple stages, with each stage including rigid plate tube section 84 and a variable positive voltage grid section 86. Ion sensors 26, generally located forward of the ridged plate tube sections 84, detect the charge of the ions at each stage and may automatically increase or decrease the potential of the variable positive voltage grids 86 to a higher or lower positive potential. Each ion sensor 26 controls the variable positive voltage grid 86 immediately downstream from the ion sensor 26. Thus, each variable positive voltage grid section 86 downstream will have a greater potential than the preceding variable positive voltage grid 86 to help in the acceleration of the airflow 22 and the dissociation of electrons from within the airflow 22. There are protruding studs 85 for each plate to accommodate a negative electrical connection at the rear of each plate. The centrifugal impeller 30 draws large volumes of ambient airflow 22 through the rigid plate tube sections 84 and the positive voltage grid sections 86, causing the molecules to undergo loss of electrons through mechanically induced atomic and molecular impacts and thermal excitation. The free electrons are collected using the positive voltage grids 86 and routed to the amplifier/controller 55 for charging batteries 60 or driving electric wheel motors 70, as described above. The gas ionization and electrical energy production section 25 may further include a filtration system positioned directly before the first rigid plate tube section 84 to filter the air before it enters the rigid plate tube sections 84.

Figure 4:
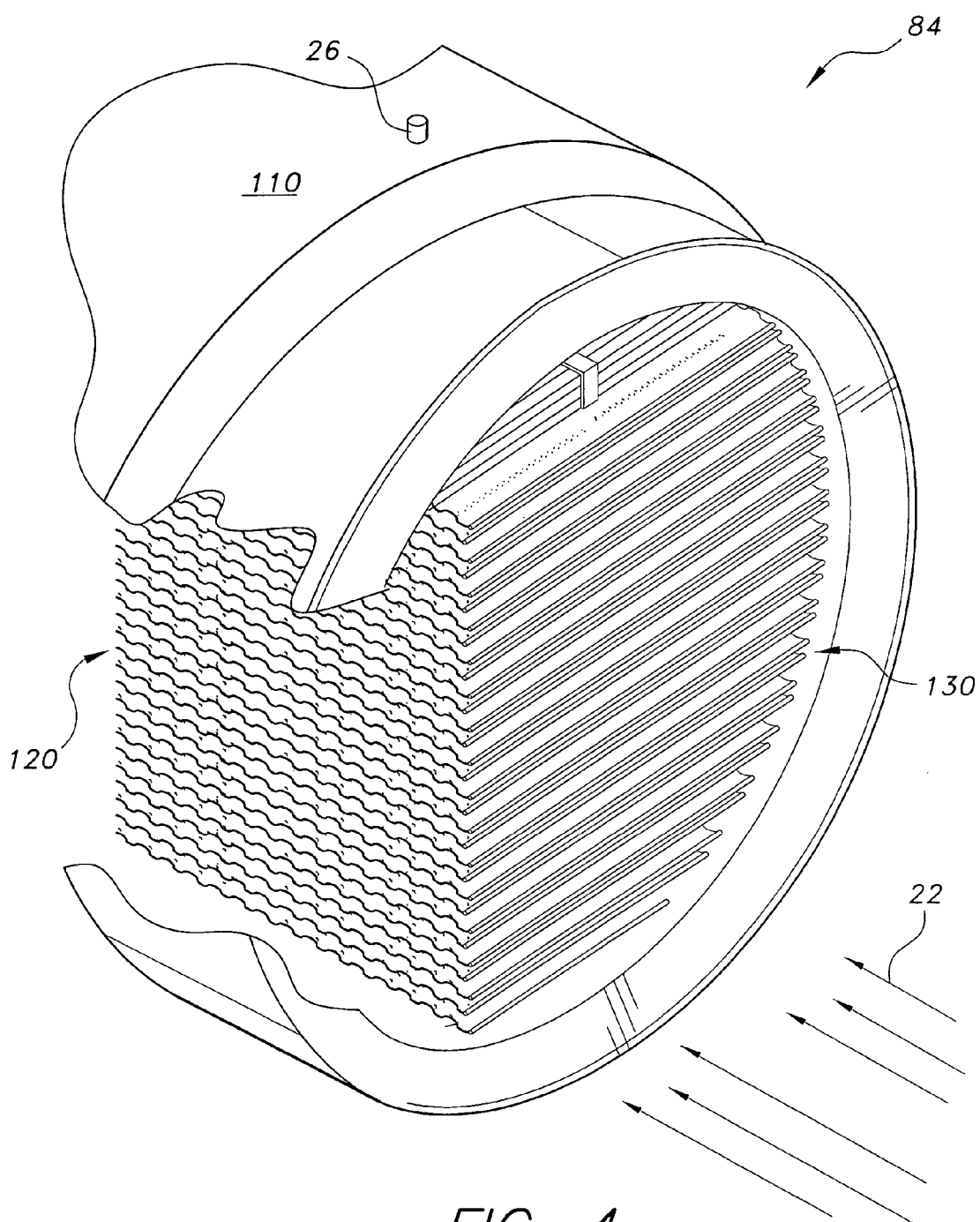
FIG. 4 is a fragmented perspective view of a rigid plate tube of the gas ionization and electric energy production section of the power system of the present invention, partially broken away to show the plate structure.

Turning now to FIG. 4, it can be seen that each rigid plate tube section 84 includes a plurality of metal alloy rigid plates 120 held in spaced-apart, parallel relationship to each other and which are embedded in an electrical insulating casing material 110, such as ceramic composition. The rigid plates 120 are preferably made of an electrically conductive material having excellent heat radiative properties, but able to withstand subsonic and supersonic shock wave pressures, produced by high velocity airflows. The casing 110 will preferably be constructed of electrical insulating material also capable of withstanding subsonic and supersonic shock wave pressures produced by high velocity airflows. The leading and trailing edges of each rigid plate 120 have an elongated rod or cylindrical end portion 130 disposed along the free edge thereof, substantially as shown, in order to maximize shock wave control. The cylindrical end portion 130 of each plate 120 protrudes through the casing 110.

Figure 5:
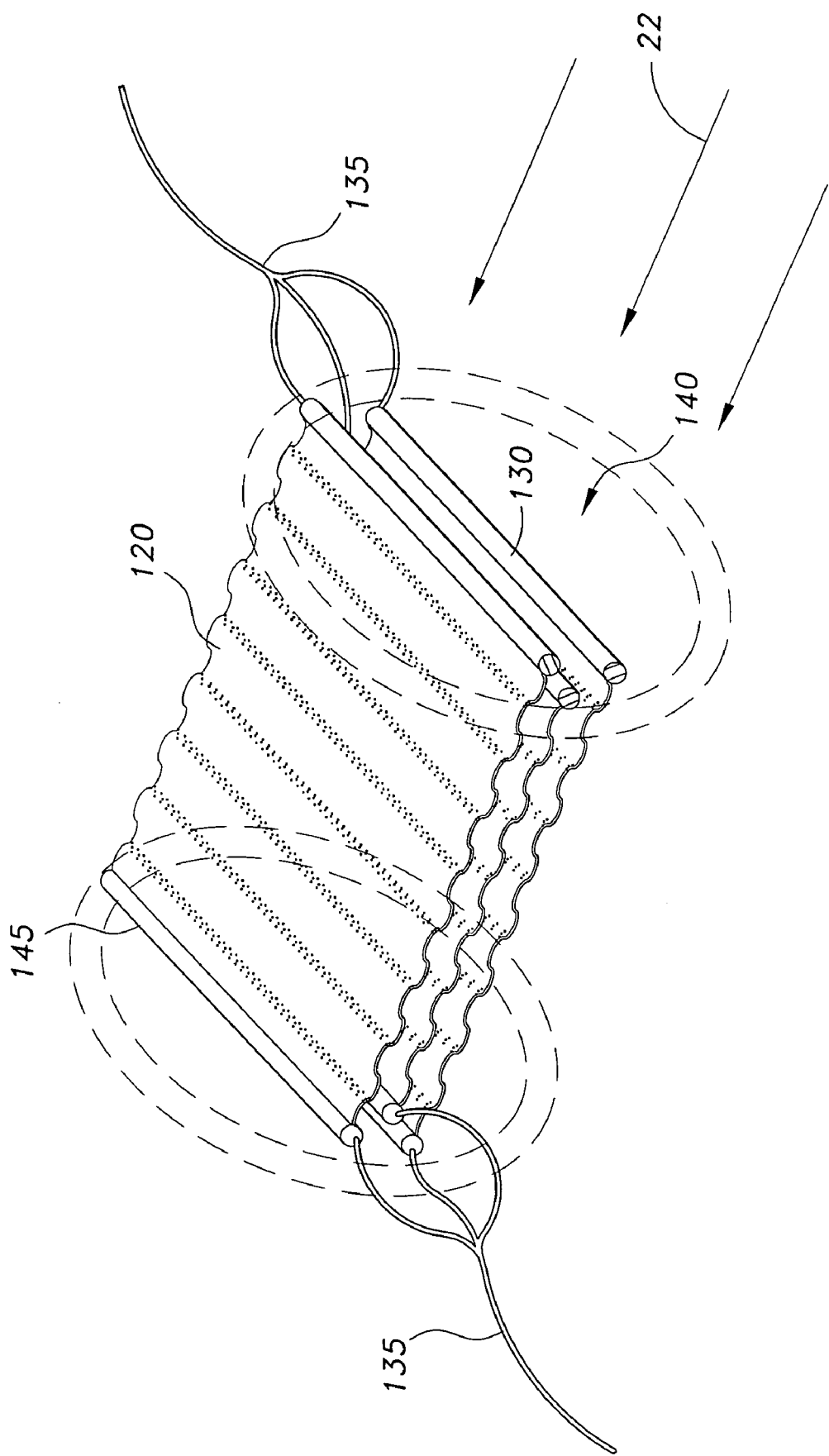
FIG. 5 is a perspective view of the rigid plates of the gas ionization and electric energy production section of the power system of the present invention.

Turning to FIG. 5, it can be seen that electrical wires 135 may be disposed on opposite ends of each plate 120 for the purpose of electrically heating the plates 120. As shown, the same construction will be on each plate 120 on both the leading 140 and the trailing 145 edge, but will extend to opposite sides of the casing to provide a more thorough heat distribution on each plate 120. It should be understood that the greater the heat to each ridged plate 120, the greater the excitation of molecules, which increases the number of electrons available to be converted into electrical power. The amplifier/controller 55 controls the amount of current to the electric wires 135 to either increase or decrease the heat radiation of each ridged plate 120. The amplifier/controller 55 varies the quantity of electrons collected based on the electrical power needs of the power system 20.

Again referring to FIG. 4, it should be noted that the structure shown is only one of a number of possible designs that may be used to excite atoms and molecules to dissociation through high velocity airflows. The rigid plates 120 are positioned substantially parallel to one another and may vary in number. The number of rigid plates 120 contained within a particular tube section 84 may also vary, dependent on the size of the power system 20 and the velocity of airflow 22. The sizes of the respective component parts vary depending on the application.

Furthermore, the power system 20 is not limited regarding the number of repetitions of alternating variable positive voltage grids 86 and rigid plate sections 84. The length of the rigid plate sections 84 may be reduced to minimize airflow resistance, but still retain a sufficient length to excite the air or cause molecular disassociation. The rigid plates 120 may have conventional structural support elements in order to help prevent an implosion from high velocity airflows. It should be understood that this specification embraces any structural support elements for the individual plates 120, whether located between a pair of plates 120, adjacent the plates 120, or otherwise located with respect thereto for improving resistance to material or structural degradation secondary to the effects of airflow 22.

Again referring to FIG. 5, it can now be clearly appreciated how the rigid plates 120 are preferably constructed to define a wavy pattern in cross-section, which, along with the characteristics of the metal alloy that give the plates 120 excellent conductivity and heat radiating properties, makes them strong enough to withstand subsonic and supersonic shockwave pressures produced by high velocity air flows. FIG. 4 also more clearly shows the cylindrical end portions 130 of the leading 140 and trailing 145 edges. The cylindrical end portions 130 may vary in size as compared to the gauge of the plate 120. The cylindrical end portions 130 also strengthen each plate 120. In the preferred embodiment, leading edge 140 provides a positive electrical lead and trailing edge 145 provides a negative electrical lead for heating the plates 120.

The spacing between each plate 120 is sufficient to allow supersonic airflow, if necessary, to attain atomic and molecular disassociation. The leading 140 and trailing 145 cylindrical end portions 130 of each plate 120 are further preferably staggered fore and aft with respect to each other and spaced-apart, substantially as shown, improving shock wave control.

Figure 6A:
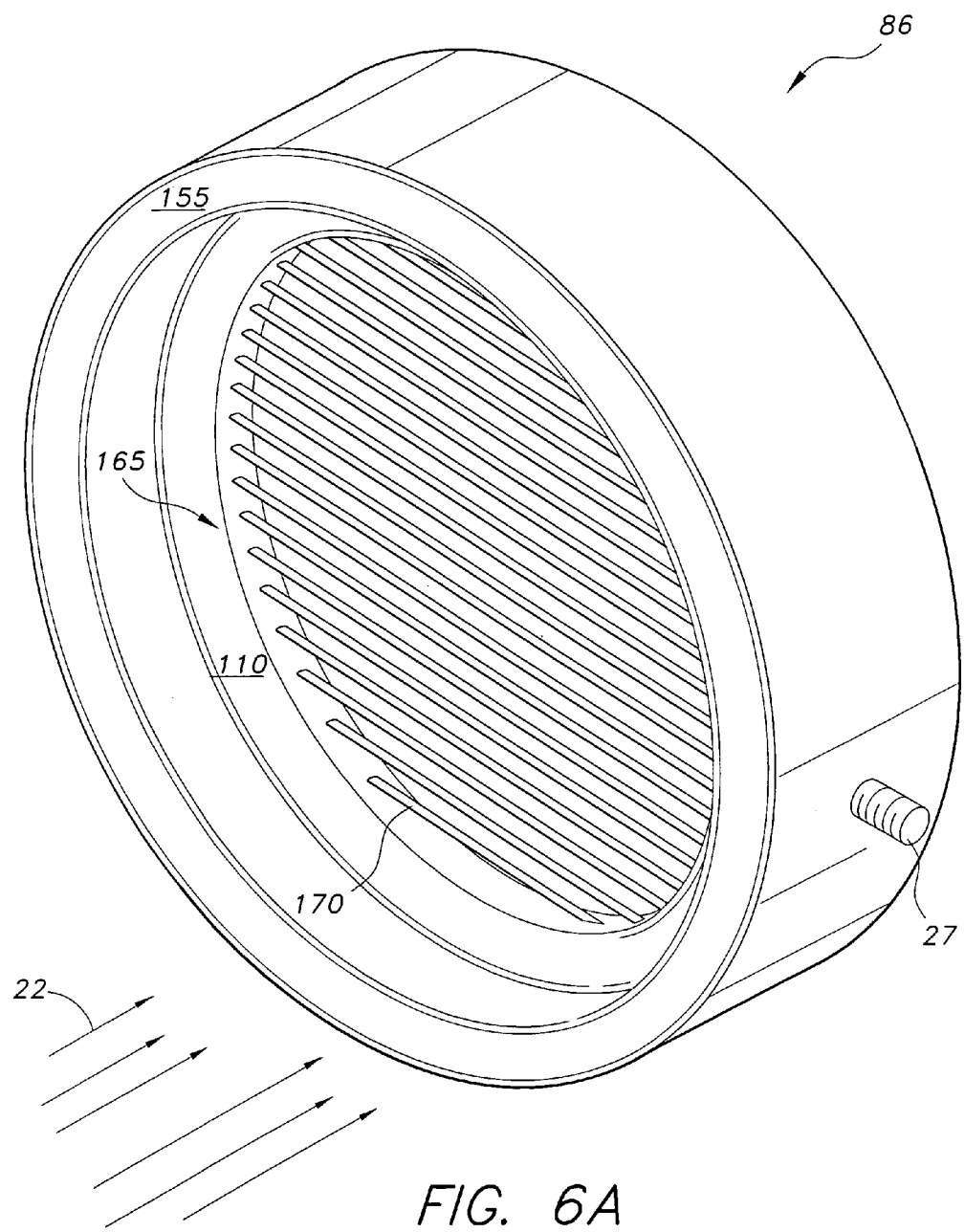
FIG. 6A is a perspective view of the variable positive voltage grid section of the gas ionization and electric energy production section of the power system of the present invention.

FIG. 6A illustrates the variable positive voltage grid section 86 in greater detail. Made up of a rim-shaped structure 155 and an integral component of the casing 110, the variable positive voltage grid section 86 preferably includes an alloy grid 165 having high electrical conductivity, and having aerodynamic parallel vanes 170, both sides of each vane 170 being fixed in casing 110 and designed to withstand extremely high velocity airflows. In the present embodiment, grid 165 is electrically connected to a single stud 27 that protrudes through casing 110.

Casing 110 may be constructed of electrically insulating material capable of withstanding high temperatures, pressures, and vibrations. The grid 165, and the vanes 170 attached thereto, are of a construction sufficiently strong to withstand vibration, high temperatures and pressures caused by supersonic and hypersonic airflows. The protruding stud 27, of which there is one for each variable positive voltage section 86, is connected to a variable positive voltage potential, controlled by the circuit components diagrammatically indicated in FIG. 10, discussed below. This variable positive voltage potential will extract the free electrons and will help accelerate the ions as they move through the gas ionization and energy production section 25. The positive voltage potential of each grid section 86 progressively increases to continue the process of ionization of the atoms and molecules, and helps to accelerate the ions.

Figure 6B:
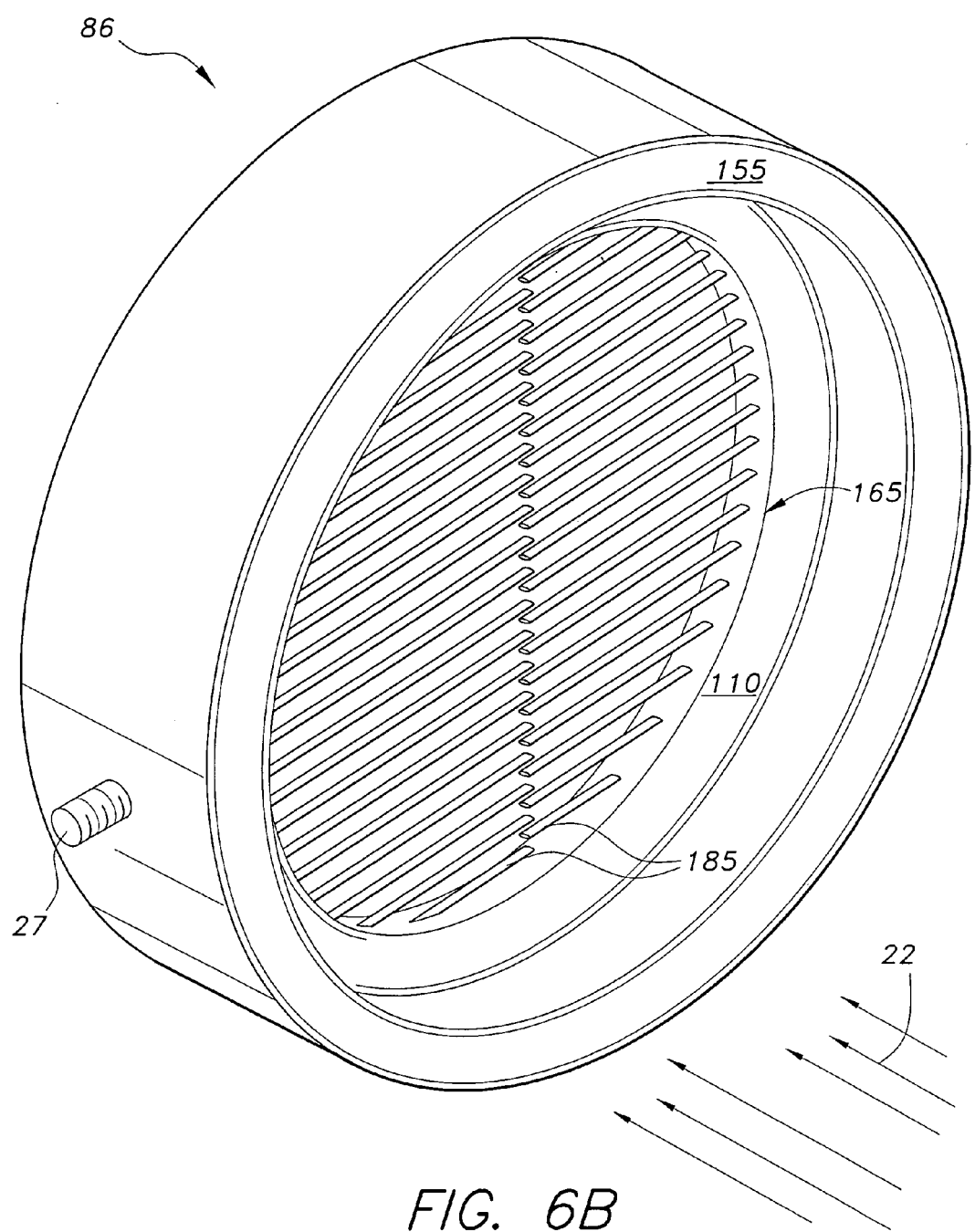
FIG. 6B is a perspective view of the variable positive voltage grid section of the gas ionization and electric energy production section of the power system of the present invention having two positive grid sections.

In FIG. 6B, an alternate embodiment of the variable positive voltage section 86 is shown. This alternate embodiment is also made up of a generally rim-shaped structure 155 and an integral component of the casing 110. However, the variable positive voltage section 86 includes two separate highly electrically conductive alloy grids, each designated 165. The individual vanes 185 and each grid 165 are embedded in the casing 110 and designed to withstand extreme high velocity flows, and each grid 165 is commonly electrically connected to a stud 27 that protrudes through the casing 110 on the respective same side of the rim-shaped structure 155. Each vane 185 is constructed broader at the base and is tapered as the top is approached. There are preferably two protruding studs 27 for each variable positive voltage section 86. The variable positive voltage potential will extract the free electrons and will help accelerate the ions as they move through the rigid plate tube section 84 and positive variable voltage sections 86. The protruding studs 27 of each variable positive voltage grid 86 are preferably connected to a one-way diode to prevent electrons from flowing back onto the grid section 86.

Figure 7:
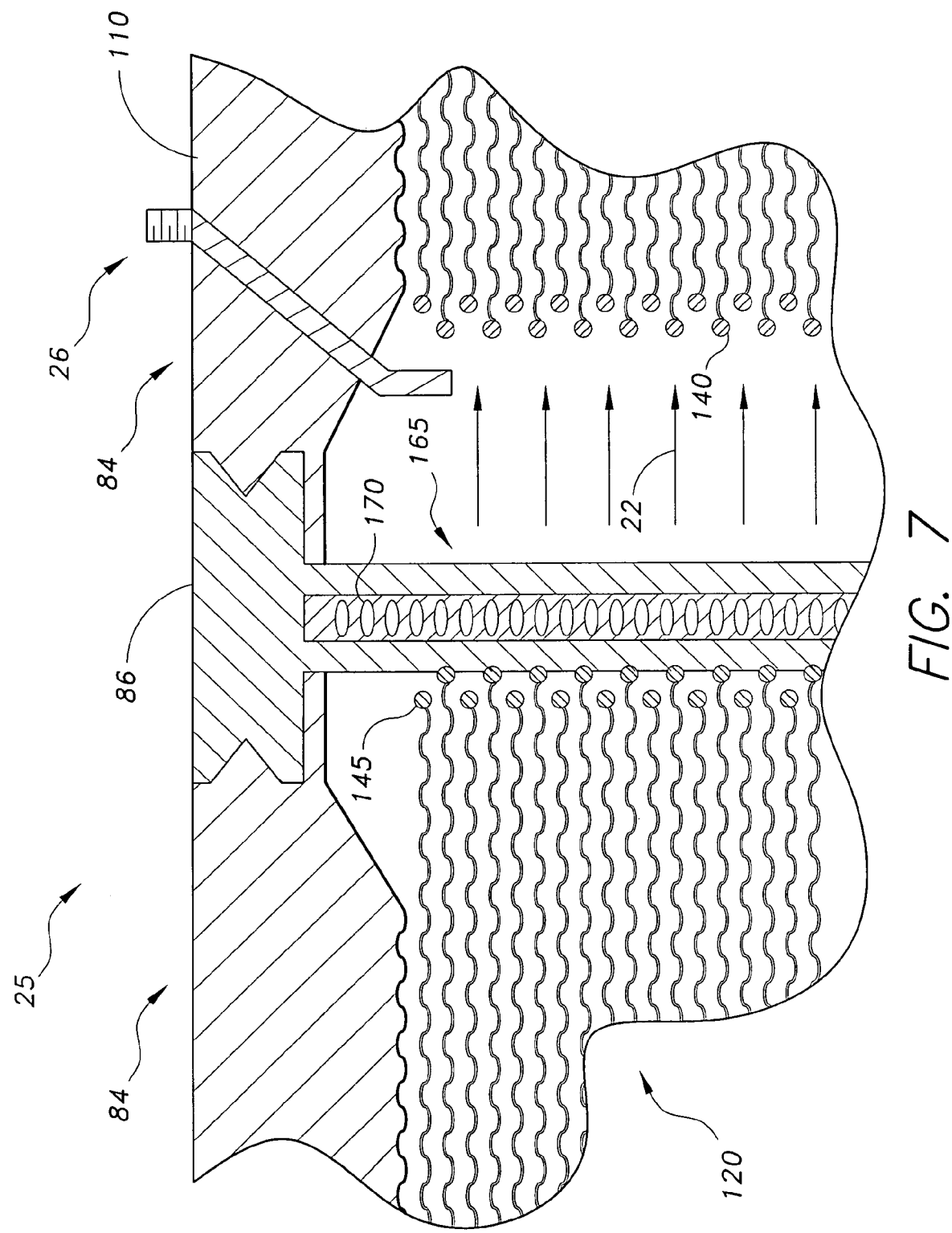
FIG. 7 is a sectional view of the union of two ridged plate tube sections onto a variable positive voltage grid section of the power system of the present invention.

FIG. 7 illustrates two rigid plate tube sections 84 separated by a variable voltage positive grid section 86. FIG. 6 further illustrates an ion charge sensor 26 mounted through casing 110, the sensor 26 detecting the charge of the ions as they flow through the gas ionization and energy production section 25. The ion charge sensors 26 are connected to the amplifier/controller 55 and operate to keep the variable positive voltage grids 86 at a greater positive potential as compared to the charge on the ions in the airflow to help accelerate the flow and dissociation process. The ion charge sensors 26 are preferably configured to be aerodynamic and able to withstand supersonic airflows.

Conventionally, ion detectors include a sensing electrode, an evaluating circuit, and an indicator means. In the preferred embodiment of the invention, the ion charge sensor 26 controls the variable positive grid 86 to its immediate rear. The heat radiating rigid plates 120 progressively increase the temperature of the air in each succeeding rigid plate tube section 84, thereby continuing the ionization process. As the air molecules start to loose electrons and become more positive, ion charge sensors 26 monitor the ionization of the air as it passes through each stage of ionic excitation. Based upon input from the ion sensors 26, the amplifier/controller 55 shown in FIG. 1 automatically increases the positive voltage potential on the next succeeding variable positive voltage grid 86 in the line of airflow 22 to continue the electron extraction process, thereby maintaining a constant flow of free electrons originating from the variable positive voltage grids 86 to the electrical studs. 27 protruding from each variable positive voltage grid section 86. Variable positive voltage generation circuits are known to those skilled in the art and typically generate a positive voltage that increases or decreases in accordance with an increase or decrease in the entered high-frequency power.

Again referring to FIG. 7, the cylindrical trailing edge 145 of each ridged plate section 84 should be in close proximity to the variable positive voltage grid 86 to immediately attract and extract the free electrons. The variable positive voltage potential, as well as the radiating heat of the rigid plates 120 may progressively increase from the front to the rear sections to continue the ionization and dissociation process. In one embodiment of the invention, the vanes 170 of the variable positive grid 165 may be parallel to the rigid plates 120 to maximize extraction of free electrons. Ion sensors 26 generally located foreword of the rigid plate tube sections 84 detect the charge of the ions at each stage and may automatically increase the potential of the variable positive voltage grids 165 to a higher positive potential as compared to the ions to help accelerate the velocity, increase dissociation, and have a greater potential for extracting electrons.

The gas ionization and energy production section 25 preferably starts with a rigid plate tube section 84 at its respective front to start the electron dissociation process, and ends with a variable positive voltage grid section 86 at its respective rear so as to continue the extraction of free electrons as much as possible. The process of extreme high velocity air flow through a repeated combination of rigid plate tube sections 84 and variable positive voltage grid sections 86 should create atomic and molecular disassociation, and extract free electrons from their normal orbits. These free electrons will be attracted to the variable positive voltage grid 86 and extracted for utilization.

Now turning to FIGS. 8-11, a detailed discussion of the ionized gas neutralizing chamber 35 is provided. The ion gas neutralizing chamber 35 may be constructed of a longitudinal tubular shaped member connected between a front centrifugal front impeller manifold 220 and a rear exhaust manifold 280. The front manifold 220 and rear manifold 280 are attached to neutralizing chamber 35 by mating male connectors 225 to female connectors 227 at annular flanges or lugs 230. The ionized gas neutralizing chamber 35, the front centrifugal impeller manifold 220 and the rear exhaust manifold 280 all have an outer casing 210 made of an electrical insulating material capable of withstanding high pressures, high vibrations, and high temperatures. The centrifugal impeller manifold 220 houses a centrifugal impeller 30. The centrifugal impeller 30 may be constructed of material capable of withstanding high temperatures and high rotational stress.

The ionized gas neutralizing chamber 35 has electric discharge plugs 275 threaded into outer casing 210. Each electric discharge plug 275 is secured to the outer casing 210 using a nut 273. The discharge plug probe 270 of the discharge plug 275 is positioned in an air path 235 to discharge or neutralize the positively charged ions in the ionized airflow 222. The ionized gas neutralizing chamber 35 includes an electric motor 40 mounted therein to drive the centrifugal impeller 30.

Figure 8:
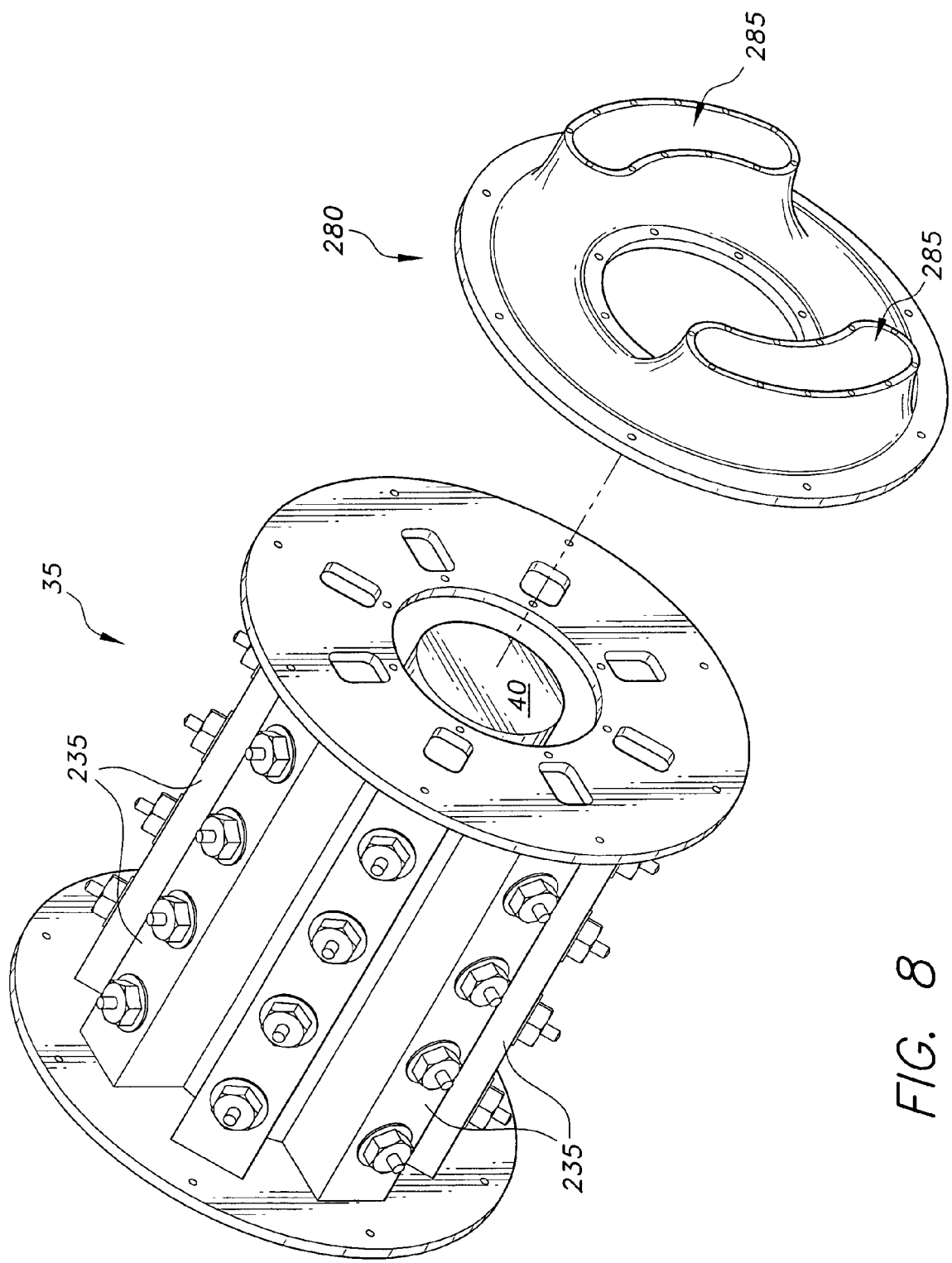
FIG. 8 is an exploded view of an ion gas neutralizing chamber section of the present invention.
Figure 11:
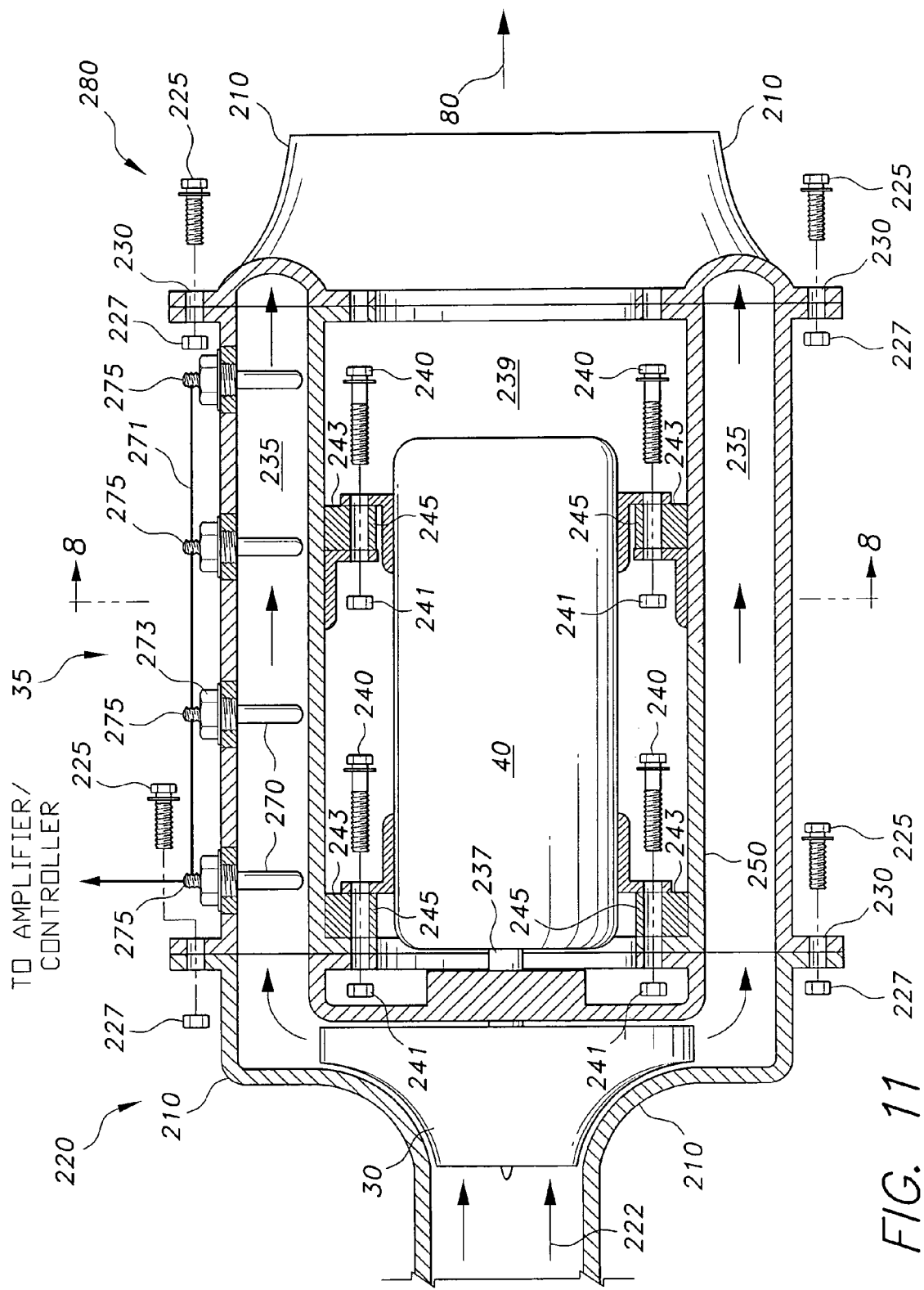
FIG. 11 is a section view of the ion gas neutralizing chamber shown in FIG. 1.
Figure 12:
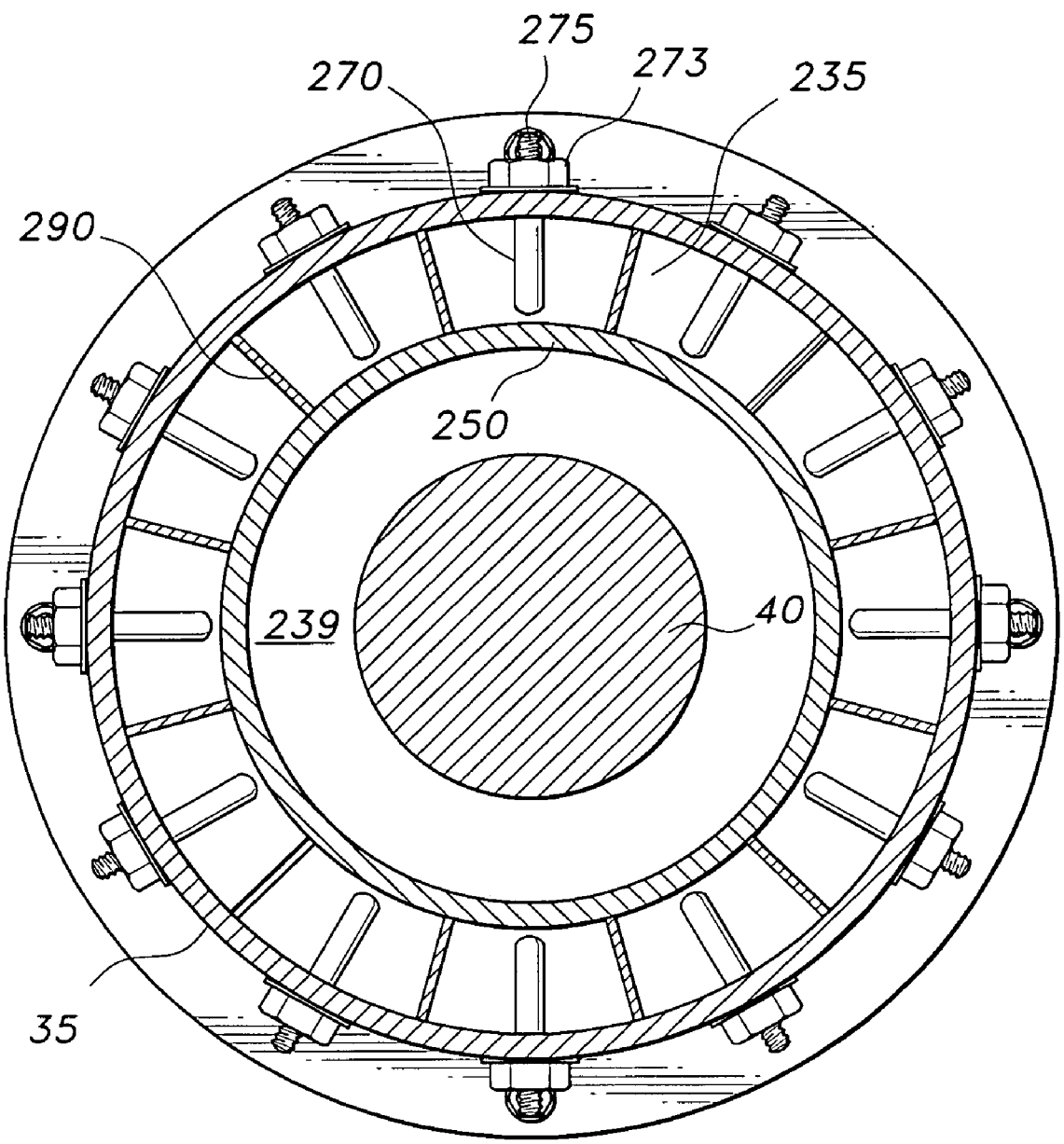
FIG. 12 is a section view along lines 8-8 of FIG. 11.
Figure 13:
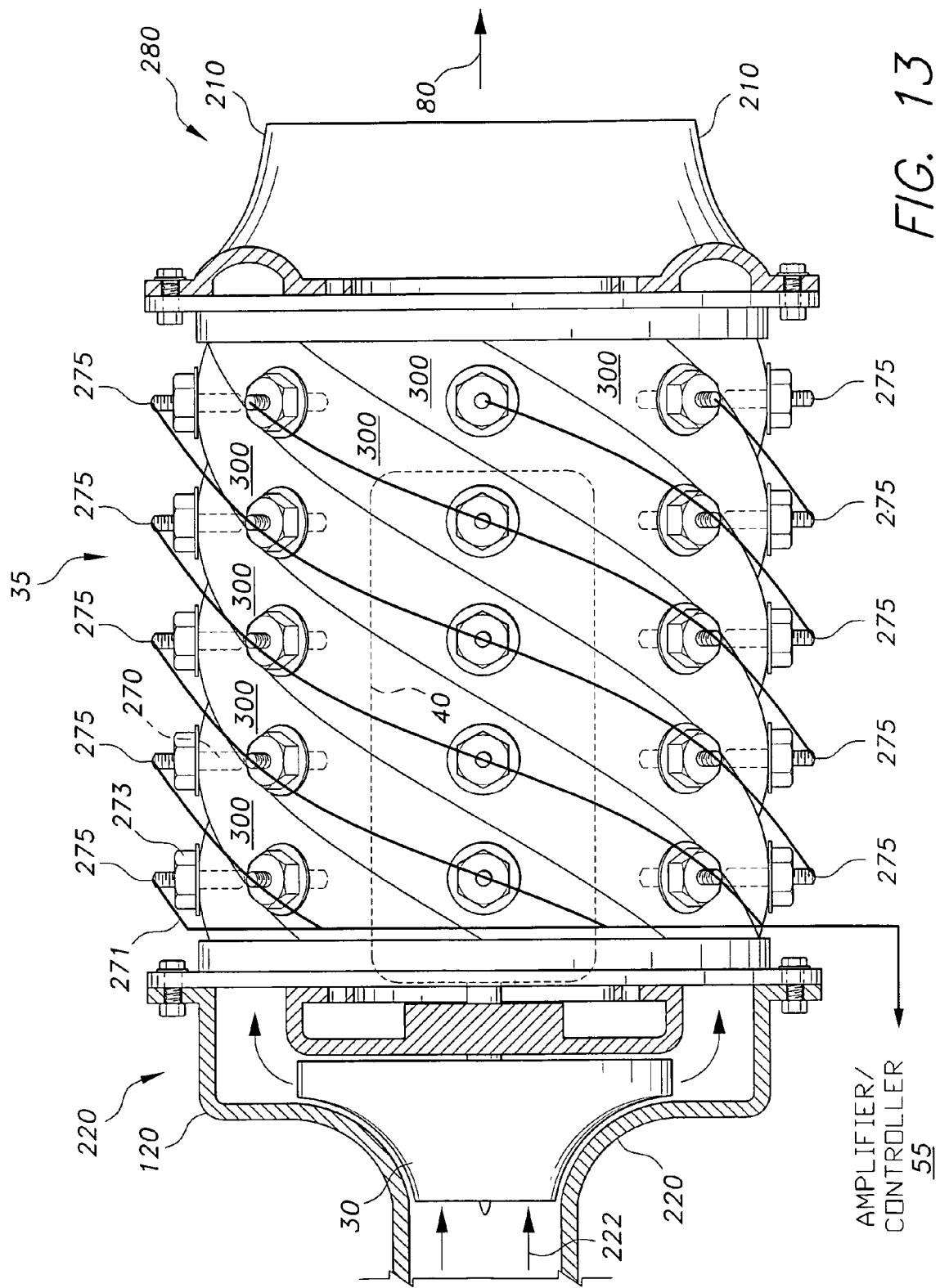
FIG. 13 is a section view of an alternate embodiment of an ion gas neutralizing chamber section of the power system of the present invention.

The circumferentially spaced apart arrangement of air paths 235 are shown in FIG. 8 and 11. This arrangement of air paths 235 allows ample space between each individual duct to allow ambient air cooling to the motor 40, and also allows access to the motor 40 for electrical connections. Each air path is configured in the form of a straight duct arrangement. However, the air path 235 may be configured with a spiral design as shown in FIG. 13, but still spaced apart from one another to allow ambient air cooling to the motor 40. The total pathway volume of the neutralizing chamber 35, the exhaust duct 280, 285, and the exhaust tail pipes 45 connected thereto, should not less than the total volume of ionization and energy production section 25, so as not to create any back pressure.

Figure 9:
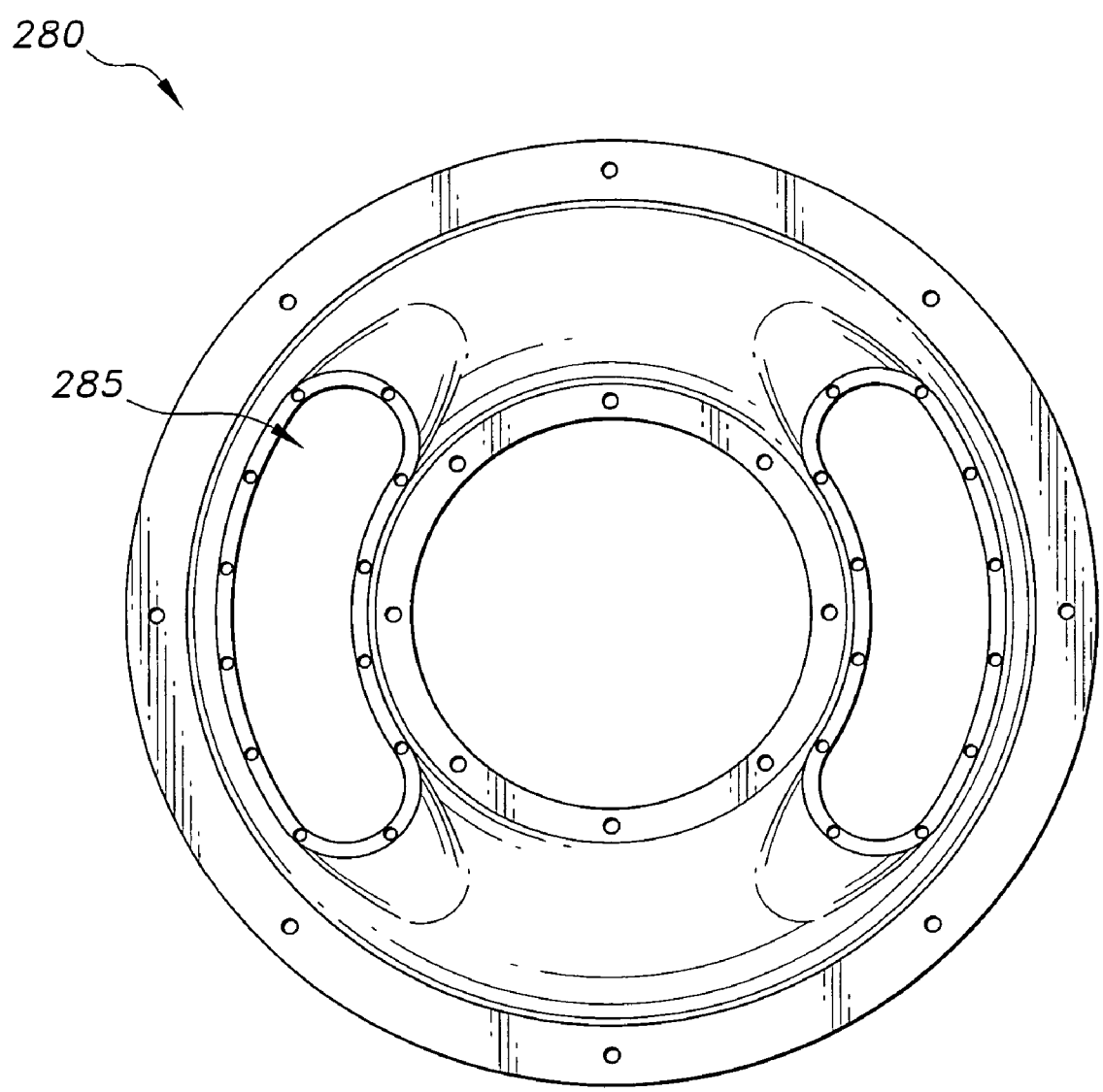
FIG. 9 is a rear view of the exhaust duct of the ion gas neutralizing chamber section shown in FIG. 8.

The rear view of the neutralizing chamber 35 is shown in FIG. 9 without the exhaust duct 280 attached. As illustrated, the inner circumference attaching bolts, as well as the mounting brackets 235, 245 and associated hardware 240, and anchor nuts 241, are accessible from the open rear area of the neutralizing chamber 35 before attaching the exhaust duct 280. After the exhaust duct 280 is attached, the central rear area remains open to provide access to the motor 40 and all associated mounting hardware.

Figure 10:
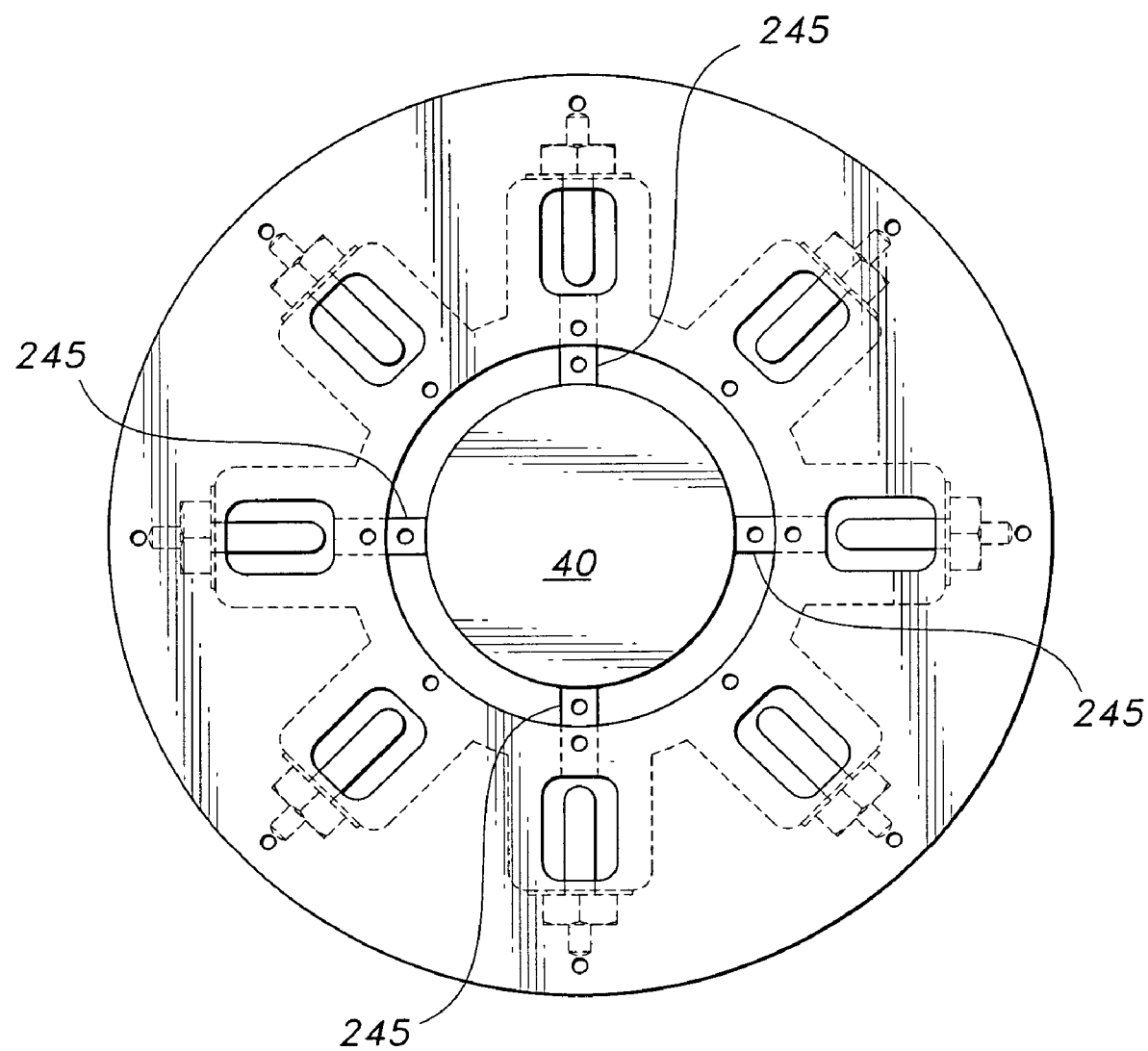
FIG. 10 is a rear view of the ion gas neutralizing chamber section shown in FIG. 8.

The rear view of the exhaust duct 280 is shown in FIG. 10. As illustrated, the open rear area of the exhaust duct 280 provides access to the motor 40 and all associated mounting hardware. The electrical connections may also be routed in between the individual air paths 235. Note the inner and outer circumference flange design, as well as flanges on the tail pip attaching ducts 285.

The electric motor 40 may optionally be an electrical generator combination. The electric motor 40 is mounted on mounting brackets 245. The electric motor 40 is secured to the mounting brackets 245 by mating the male connectors 240 with the female connectors 241 through the mounting bracket 245. The mounting brackets 245 and the connectors 240 and 241 are of sufficient size and strength to secure the electric motor within the ionized gas neutralizing chamber 35. Mounting brackets 245 may additionally include a heat insulating material to minimize heat transfer.

The electric motor 40 is encased within an electrically insulating material 250 that is capable of withstanding high pressures, high vibrations, and high temperatures so that the heat and electrical charges resulting from operation of the electric motor 40 will have a negligible effect on the operation of the ionized gas neutralizing chamber 35. An air gap 239 is provided within the encased electrically insulating material 250 to allow the electric motor 40 space to be cooled. In addition, a plurality of individual air paths 235 are formed completely around the electric motor 40, but independently from one another in order to let ambient air flow in between the ducts 235 for cooling the electric motor 40. The rear manifold 280 provides an exhaust system for exhaust 80 to exit the neutralized gas neutralizing chamber 35. The exhaust 80 exits the rear manifold 280 through duct 285.

Ionized gas neutralizing section 35 works as follows. Electric motor 40 is mechanically connected to a centrifugal impeller 30 via shaft connection 237. The electric motor 40 is used to cause centrifugal impeller 30 to rotate to draw high velocity ambient airflow 22 through gas ionization and energy production section 25, causing the ambient airflow 22 to become positively charged due to electron extraction by the positive voltage grids 86. Thus, the gas ionization and energy production section 25 converts the ambient airflow 22 into a positively charge ionized airflow 222.

The centrifugal impeller 30 draws the ionized airflow 222 exiting the gas ionization and energy production section 25 into a plurality of ducts 235 of the ion gas-neutralizing chamber 35 so that the positively charged ions within the ionized air flow 222 may be discharged or neutralized. Each individual duct 235 includes a plurality of electron discharge plugs 275 that can electrically discharge or neutralize the positively charged ions contained within ionized airflow 222. The discharge plugs 275 are securely inserted into each individual duct 235 and electrically connected in series via conducting wire 271 to amplifier/controller 55.

The positively charged ion air flow 222 acting on the electron discharge plug probe 270 of electron discharge plug 275 establishes a positive electrical potential signal to the amplifier/controller 55 to draw electrons onto the discharge probes 270 and electrically neutralize the positively charged ions in ionized air flow 222. After the ionized air flow 222 has passed the discharge plugs probes 270 and the positively charged ions are neutralized, the ionized air flow 222 is converted into an exhaust gas 80 and exits the ion gas neutralizing chamber 35 via duct 285. Duct 285 routes the exhaust gas 80 to tail pipes 45 where the exhaust gas 80 is monitored by ion gas sensors 50 to detect whether the positively charged ions within the exhaust gas 80 have been properly neutralized before entering the atmosphere.

The individual ducts 235 are illustrated in greater detail in FIG. 13. The ionized gas neutralizing chamber 35 is comprised of a plurality of individual straight ducts 235 surrounding the electric motor 40, the ducts being separated by radially extending partition walls 290. The ionized gas neutralizing chamber 35 includes air gap 239 to help cool electric motor 40 of centrifugal impeller 30. Only the first or front electron discharge plug 275 has an electrical connection to the amplifier/controller 55. Electron discharge plug probes 270 are constructed of high electrically conductive material able to withstand high velocity airflow and high temperatures. After the exhaust 80 passes the sensors 50, the exhaust 80 exits the tailpipes 45 and is expelled back into the atmosphere.

FIG. 13 shows an alternate embodiment of the ionized gas neutralizing chamber 35 of FIGS. 8-11 that operates in the same manner as the ionized gas neutralizing chamber 35 of FIGS. 8-11. After the air flow 222 containing positively charged ions plasma has passed the discharge plugs 270 and the positively charged ions are neutralized, air flow 222 exits the ion gas neutralizing chamber 35 via ducts 305. Ducts 305 route the airflow 222 to tail pipes 45 (shown in FIG. 1) where the exhaust 80 is expelled back into the atmosphere. The individual ducts 300 differ from ducts 235 in that ducts 300 extend in a spiral or helical formation to allow addition of more electron discharge plugs to each duct 300 to more effectively neutralize the ionized plasma and cool the system than the individual ducts 235 of FIGS. 7-8. The electron discharge plugs 275 are electrically connected in series with only the lead edge plugs of each individual duct 300 connected to the amplifier/controller 55.

Figure 14:
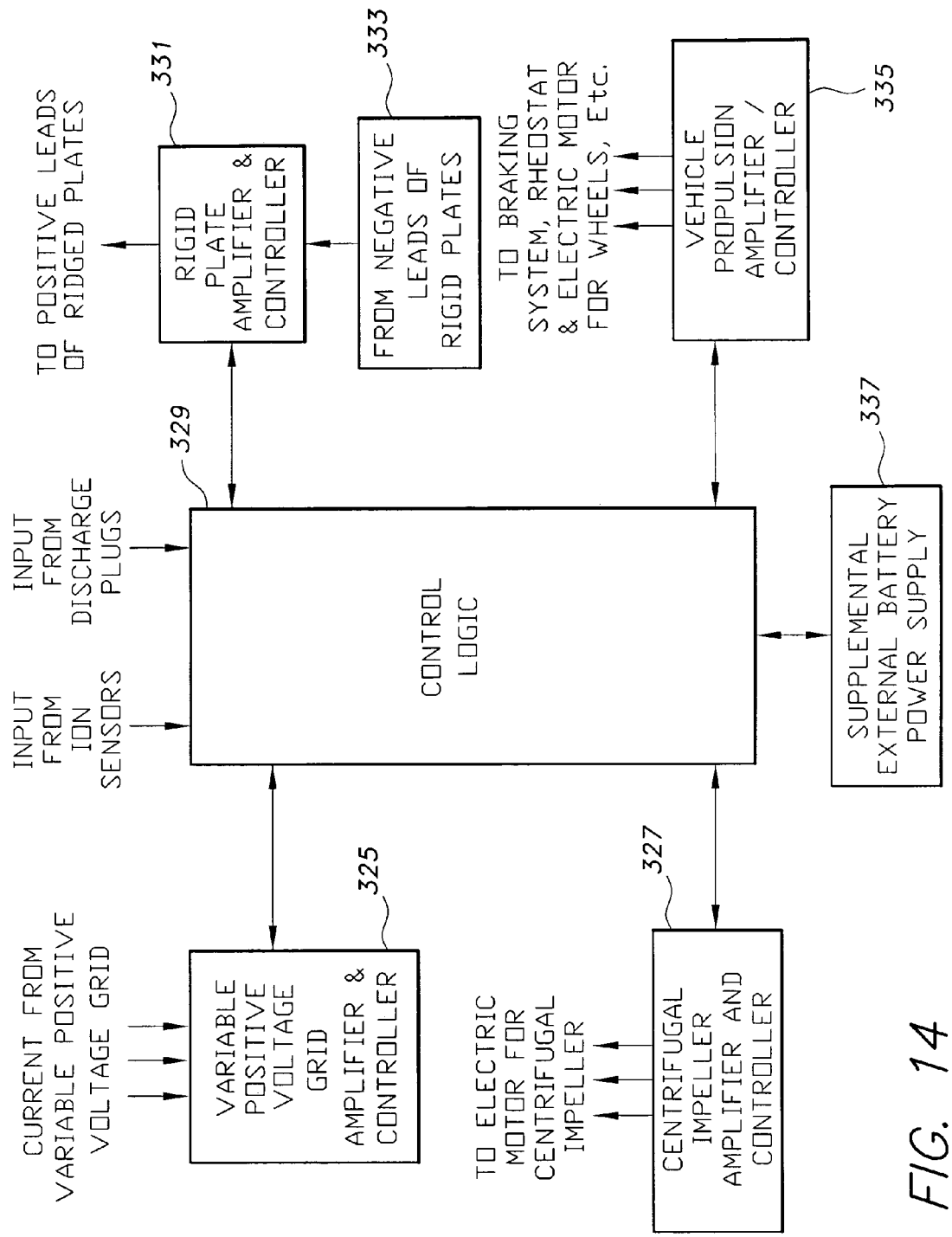
FIG. 14 is a block diagram of the control logic for the gas ionization and electric energy production section of the power system of the present invention.

The operation of the power system 20 is regulated by an amplifier/controller 55. The amplifier/controller comprehends a plurality of devices, or a single device performing a plurality of functions under the direction of a microprocessor or microcontroller control logic 329, as reflected in FIG. 14. The control logic 329 monitors the charge on the ionized air flow as it passes through the rigid plate tubular sections 84 and regulates the voltage to the positive voltage grid sections 86. The amplifier/controller 55 is also responsible for controlling the current to the plates 120, thereby guaranteeing increased ionization as the ionized air flow progresses through the energy production section 25, as well as controlling the neutralization of the charge on the exhaust 80, which is discussed in later in greater detail.

Specifically, input from the ion sensors 26, ion sensors 50, and discharge plugs 275 are monitored by the control logic 329. The control logic 329, in turn, electronically communicates with the rigid plate amplifier and controller logic 331 that regulates current to the rigid plates 120 for heating the tubular sections 84. Under control of control logic 329 and the variable positive voltage grid amplifier and controller 325, the voltage applied to the variable positive voltage grid 86 is adjusted and the current drawn off from the grid 86 is regulated. Under the control of control logic 329, vehicle propulsion amplifier and controller 335 provides sufficient electrical power to operate an electrically powered vehicle propulsion system, including a conventional rheostat, a braking system, and electric wheel motors 70. Voltage and current is applied to the vehicle propulsion system to propel or stop the wheeled land vehicle as desired. A source of supplemental power 337 provides backup power and serves as a means for bootstrapping the device until electric energy is produced in sufficient quantity to operate the control logic. The supplemental power 337 provides sufficient electric power to a conventional electric vehicle propulsion system to run all accessory electric systems, including air conditioning, stereo/radio, electric heating, AC output from inverter, windshield-wiping systems, etc.

A conventional electric vehicle propulsion system may include an electric rheostat, a cruise control switch, a multi-position electric switch, a braking system, and drive wheel electric motors to propel the vehicle. A conventional electric rheostat on a dash panel may vary the electric signal sent to the drive wheel electric motors 70 to control the speed of vehicle, but only after determining that a separate cruise control-switch is in the off position. The electric rheostat may also be used to control the speed of electric motor 40 that drives centrifugal impeller 30, and to increase electrical power to inverter as required. A foot pedal controlled rheostat electric signal will control the speed of the vehicle via amplifier/controller 55, but only when the cruise control switch is in the off position. A separate multi-position electric switch on the dash panel will give the driver the option of rear wheel drive, front wheel drive, or all wheel drive. The multi-position electric switch is easily within the drivers reach, with indicators for reverse, neutral, drive, D1 low, and D2 low. The electric switch may be rotary, or linear type. In the reverse position, the electric signal being sent to the drive motors would be of opposite polarity, as compared to the electric signals for the forward position. In the neutral position, no electric signals will be sent to the drive motors, but will only rotate the electric motor 40 on centrifugal impeller 30 to produce electric power, via electric rheostat on foot pedal, or electric rheostat on dash panel. In the drive position, an electric signal will be sent to the drive motors of opposite polarity as compared to the electric signal in the reverse position. Depending on application and size of vehicle, D1 low and D2 low positions are optional. D1 low position will send an electric signal to drive motors of the same polarity as the drive position, but will be amplified to double the torque produced by the drive motors. D2 low position will progressively amplify the electric signal to maximize torque and speed. The braking system on the vehicle may include a conventional electric disk, hydraulic disk, shoe and drum, or any combination thereof, described in the prior art. Manual foot, or hand braking systems may also be employed, also described in the prior art.

Figure 15A:
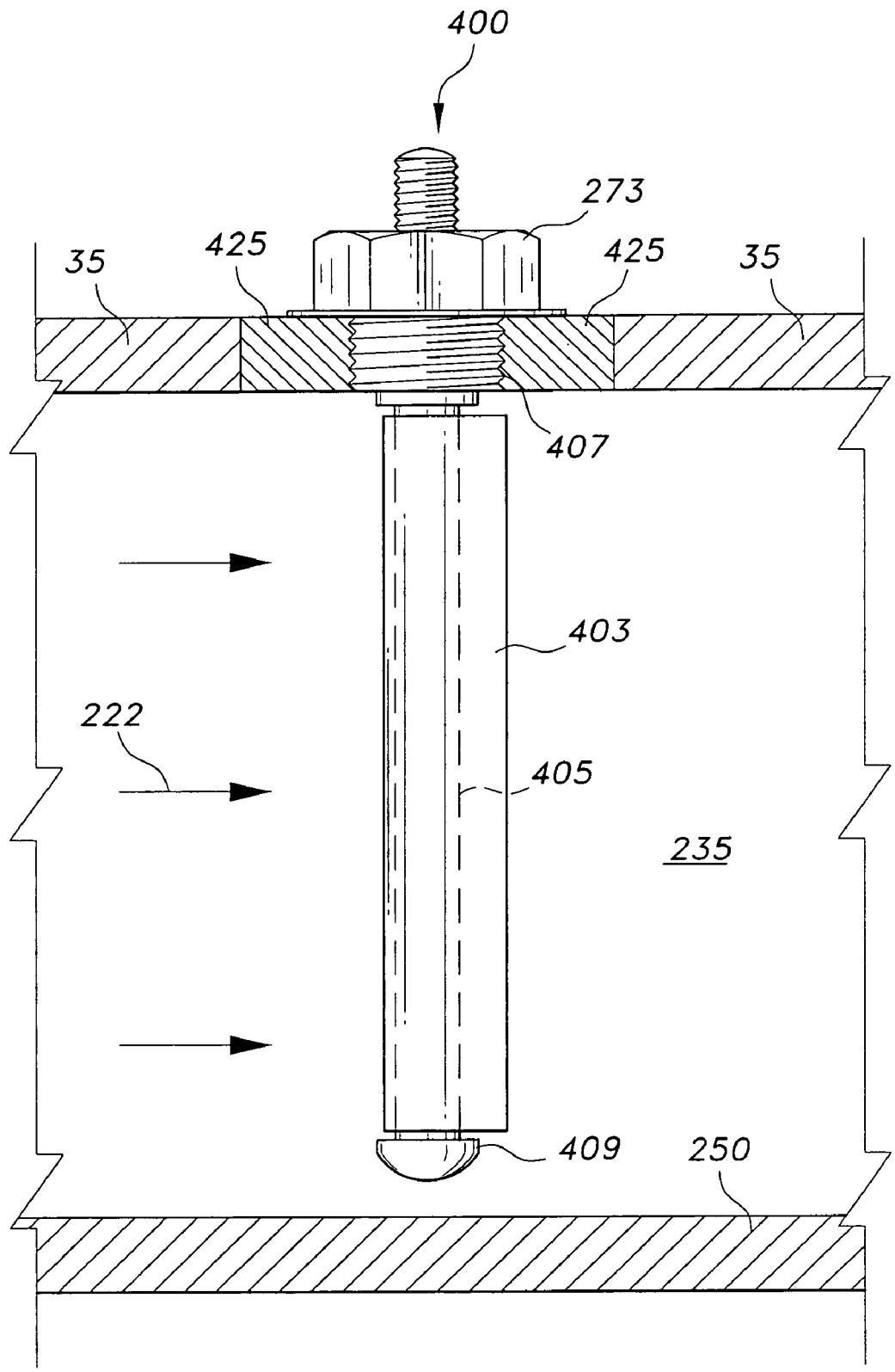
FIG. 15A is a fragmented, section view of an electron discharge plug screwed into a duct in the power system of the present invention.

FIGS. 15A-15E show various embodiments of the discharge plugs 275 in greater detail. FIG. 15A shows a first discharge plug 400 screwed into an metal alloy insert material 425 of an individual air duct 235 for securely tightening discharge plug 400 into the air duct 235. The discharge plug 400 has a threaded metallic casing 407 for screwing the discharge plug 400 into the air duct 235. Each discharge plug 400 utilizes a "V" shaped leaf 403 that snugly fits around a center shaft 405, but also rotates about the center shaft 405 and configures itself into ionized airflow 222 so that the impact of the ionized airflow 222 contacting the "V" shaped leaf 403 causes eddies to form and slow the velocity of the ionized airflow 222 to more effectively neutralize positively charged ion within the ionized airflow 222. The base 409 of the discharge plug 400 is not anchored to the insulating material 250 encapsulating motor 40. Thus, the plug 400 is constructed to withstand high velocity airflow and high temperatures.

Figure 15B:
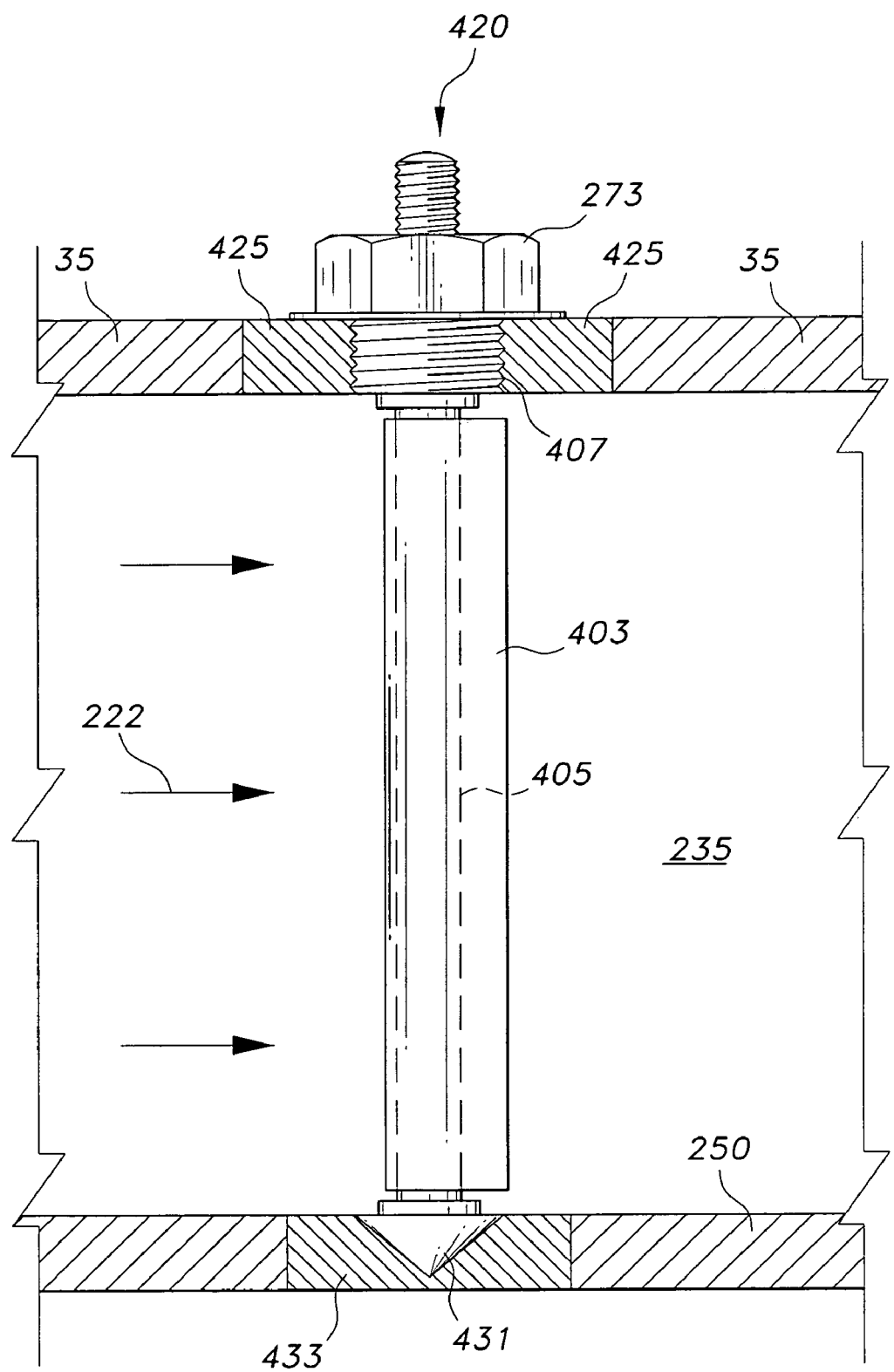
FIG. 15B is a fragmented, section view of another embodiment of the discharge plug of an electron discharge plug of the power system of the present invention.

FIG. 15B shows an alternate embodiment of a discharge plug 420 inserted into a duct 235 which also has a metallic base 431 molded into electrical insulating casing 433 in encapsulating material 250 that anchors and secures discharge plug 420. The anchored discharge plug 420 relies on its metallic base 431 anchored in casing 433 to withstand high velocity airflow and high temperatures.

Figure 15C:
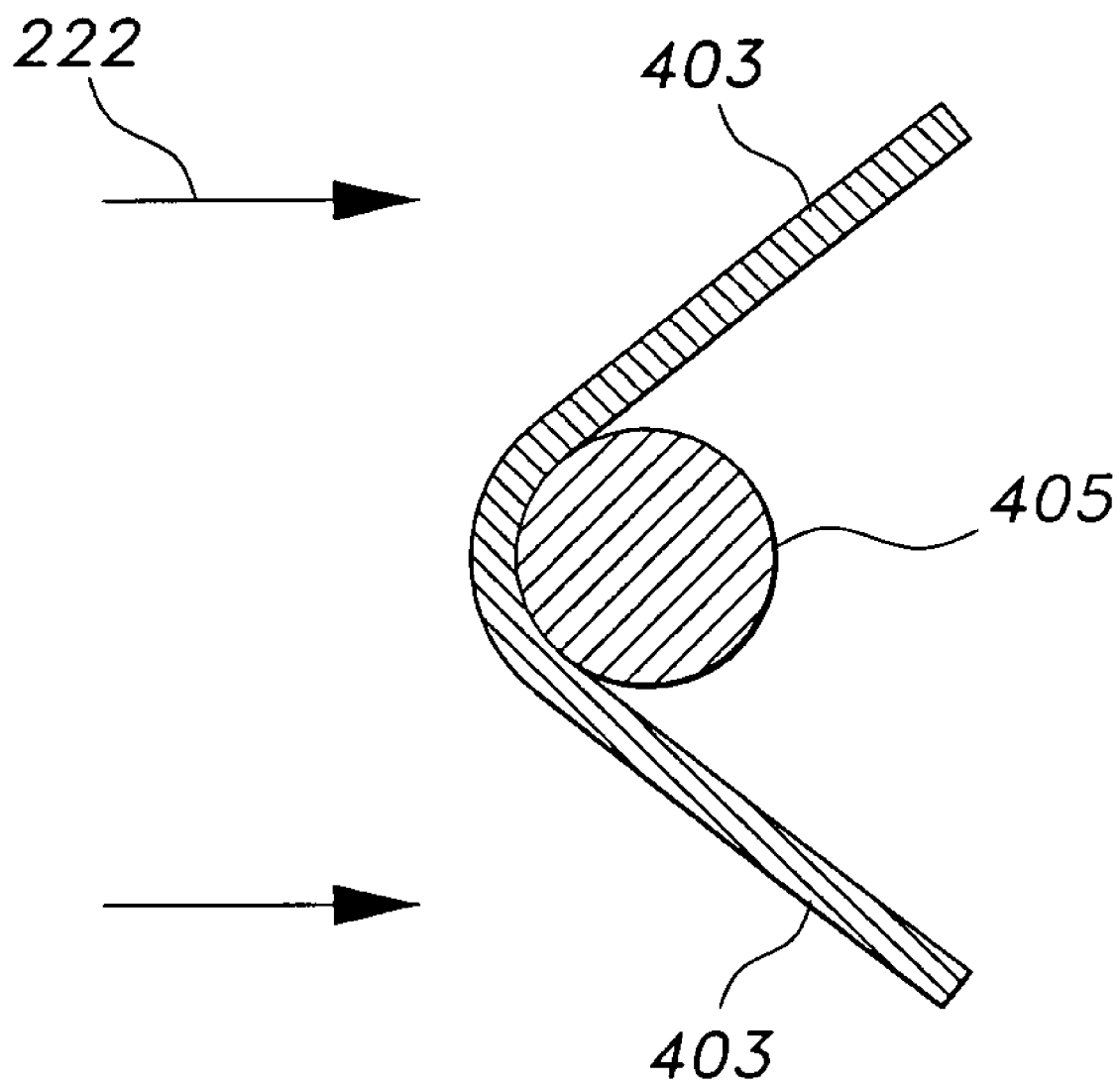
FIG. 15C is a top section view through the discharge plug of FIG. 15B.

FIG. 15C shows a top view of the shaft 405 and "V" shaped leaf 403 of a discharge plug. The shaft 405 and leaf 403 are made of metallic material. Once the V-shaped leaf 403 configures itself in the ionized airflow 222 to cause eddies, its grip on the center shaft 405 will increase and will more efficiently discharge electrons to neutralize ionized airflow 222.

Figure 15D:
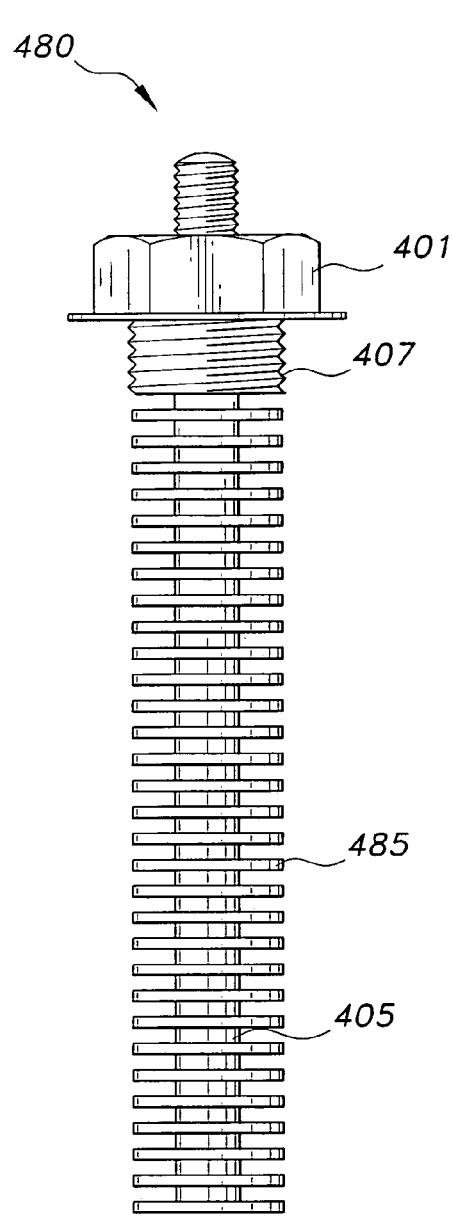
FIG. 15D is an elevation view of another embodiment of a discharge plug of the power system of the present invention, having increased surface area.

FIG. 15D shows another variation of the discharge plug. Discharge plug 480 includes a stacked washer design having a plurality of metallic washers 485 spaced a predetermined distance apart around a center shaft 405. The metallic washers 485 provide an increased surface area to more effectively discharge electrons into positive charged ion plasma.

Figure 15E:
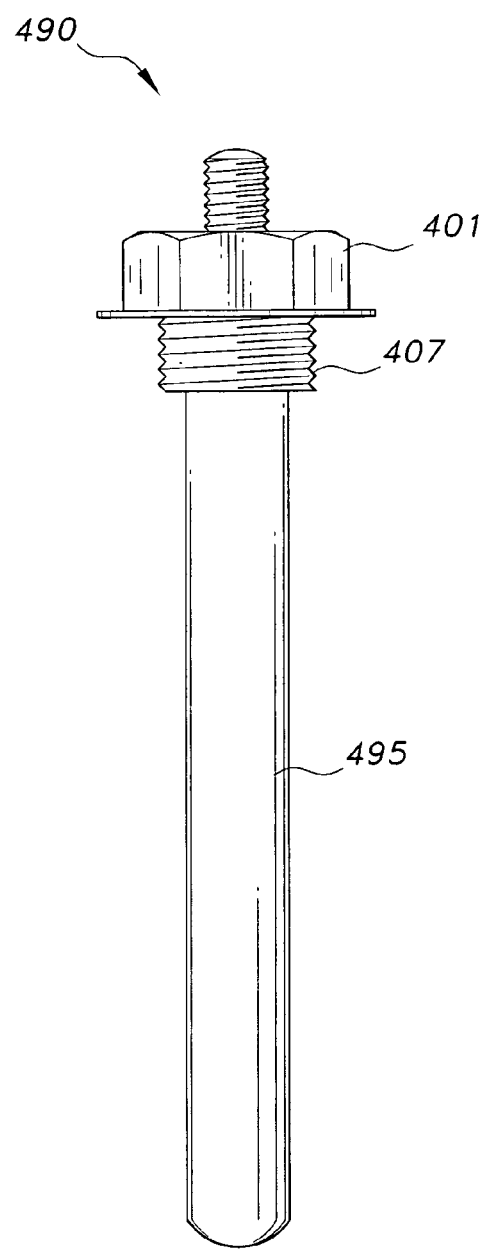
FIG. 15E is an elevation view of still another embodiment of a discharge plug of the power system of the present invention, also having an increased surface area.

FIG. 15E shows another embodiment of the discharge plug. Discharge plug 490 has a central shaft 495 with an increased surface area to more effective discharge electrons into positive charged ion plasma. The discharge plug 490 is made of high electrical conductivity, but able to withstand high velocity and high temperatures.

The power system 20 is designed to produce more than sufficient electric power to run an electric vehicle propulsion system and all accessory electric systems including air condition, stereo/radio, electric heating, AC output from inverter, windshield wiping systems, etc.

The power system 20 may incorporate magnetic bearings, and mechanical silicon nitride or ceramic bearings. These types of bearings require no maintenance and never require lubrication. These bearings also have a very high reliability due to silicon nitride or ceramic bearings and a low vibration characteristics.

A variation to the four electric drive motors would be to have only two drive motors. Each of the two motors would drive a front and rear differential and axle assembly with positive traction to ensure synchronization. This type of vehicle may optionally employ a transmission, and will have to utilize a manual braking system sufficient to hold the vehicle on steep grades when parked.

The electrical energy production system may also be utilized as a residential/industrial power system. After electrons are extracted and utilized, they will be electrically routed back to the ionized gas neutralizing chamber, to neutralize all positive ion gas before being expelled back out into the atmosphere.

The vehicle drive system may also employ any combination of electric drive systems known in the prior art.

It is to be understood that the present invention is not limited to the embodiments described above, but encompasses any and all embodiments within the scope of the following claims.

I claim:

1. A power system for an electrically powered land vehicle, comprising:
   a gas ionization and energy production section including
   a plurality of abutting tubular members defining an airflow path having an input end and an output end, each of the tubular members having:
   a rigid plate section having a plurality of heating plates for exciting air to an elevated energy level, the heating plates being disposed in spaced-apart relationship to allow the flow of air through the section;
   a variable positive voltage grid for collecting charged particles; and at least one sensor for detecting the charge of said charged particles;

means for drawing air into the input end of the airflow path in order to establish an airflow through the gas ionization and energy production section;

means for distributing the charged particles to the land vehicle's battery and propulsion system; and means for regulating a potential of the variable positive voltage grid.

2. The power system according to claim 1, wherein said means for drawing air comprises a centrifugal impeller disposed in said airflow path.

3. The power system according to claim 2, wherein said means for drawing air further comprises an electric motor coupled to said centrifugal impeller.

4. The power system according to claim 1, further comprising an ionized gas neutralizing chamber at the output end of said airflow path.

5. The power system according to claim 4, further comprising a plurality of discharge electrodes extending into said neutralizing chamber for discharging charged particles into the airflow path in order to neutralize ionized gases in the airflow path.

6. The power system according to claim 5, wherein each said discharge electrode further comprises a shaft and a V-shaped leaf rotatable around the shaft in order to slow airflow through said neutralizing chamber.

7. The power system according to claim 1, wherein said means for drawing air comprises a centrifugal impeller disposed in the airflow path and an electric motor coupled to the impeller, the system further comprising an ionized gas neutralizing chamber surrounding the electric motor.

8. The power system according to claim 1, further comprising means for controlling said heating plates in order to vary the heat supplied to each said rigid plate section.

9. The power system according to claim 1, further comprising an ionization sensor at the output end of the airflow path for detecting an ionization potential of air exiting the energy production system.

10. A power system for an electrically powered land vehicle, the land vehicle having at least one ground-engaging wheel, comprising:

a gas ionization and energy production section including a plurality of abutting tubular members defining an airflow path having an input end and an output end, each of the tubular members having:

a rigid plate section having a plurality of heating plates for exciting air to an elevated energy level, the heating plates being disposed in spaced-apart relationship to allow the flow of air through the section;

a variable positive voltage grid for collecting charged particles; and at least one sensor for detecting the charge of said charged particles;

means for drawing air into the input end of the airflow path in order to establish an airflow through the gas ionization and energy production section;

means for regulating a potential of the variable positive voltage grid;

a combination amplifier and controller electrically connected to each of the variable positive voltage grids;

a battery electrically connected to said combination amplifier and controller;

a drive motor coupled to the at least one ground-engaging wheel, the drive motor being electrically connected to said battery and said combination amplifier and controller;

wherein said combination amplifier and controller distributes the charged particles to the battery and the drive motor.

11. The power system according to claim 10, wherein said means for drawing air comprises a centrifugal impeller disposed in said airflow path.

12. The power system according to claim 11, wherein said means for drawing air further comprises an electric motor coupled to said centrifugal impeller.

13. The power system according to claim 10, further comprising an ionized gas neutralizing chamber at the output end of said airflow path.

14. The power system according to claim 13, further comprising a plurality of discharge electrodes extending into said neutralizing chamber for discharging charged particles into the airflow path in order to neutralize ionized gases in the airflow path.

15. The power system according to claim 14, wherein each said discharge electrode further comprises a shaft and a V-shaped leaf rotatable around the shaft in order to slow airflow through said neutralizing chamber.

16. The power system according to claim 10, wherein said means for drawing air comprises a centrifugal impeller disposed in the airflow path and an electric motor coupled to the impeller, the system further comprising an ionized gas neutralizing chamber surrounding the electric motor.

17. The power system according to claim 10, further comprising means for controlling said heating plates in order to vary the heat supplied to each said rigid plate section.

18. The power system according to claim 10, further comprising an ionization sensor at the output end of the airflow path for detecting an ionization potential of air exiting the energy production system.

* * * * *